(12) United States Patent
Martin et al.

(10) Patent No.: US 8,599,829 B2
(45) Date of Patent: *Dec. 3, 2013

(54) SYSTEM AND METHOD FOR HARDWARE ACCELERATION IN A HYBRID WIRED/WIRELESS LOCAL AREA NETWORK

(75) Inventors: Richard Martin, Morgan Hill, CA (US); Yong Kim, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/299,151

(22) Filed: Nov. 17, 2011

(65) Prior Publication Data

US 2012/0127979 A1    May 24, 2012

Related U.S. Application Data

(63) Continuation of application No. 10/657,942, filed on Sep. 9, 2003, now Pat. No. 8,068,479.

(60) Provisional application No. 60/435,982, filed on Dec. 20, 2002, provisional application No. 60/411,261, filed on Sep. 17, 2002, provisional application No. 60/411,301, filed on Sep. 17, 2002, provisional application No. 60/435,984, filed on Dec. 20, 2002.

(51) Int. Cl.
*H04W 4/00* (2009.01)
*H04L 12/28* (2006.01)

(52) U.S. Cl.
USPC .......................................... 370/351; 370/338

(58) Field of Classification Search
USPC .......... 455/457, 449, 451, 424, 406; 370/351, 370/338, 401; 709/223, 225; 713/189, 153
See application file for complete search history.

(56) References Cited

U.S. PATENT DOCUMENTS

| 6,393,474 B1 | 5/2002 | Eichert et al. |
| 6,954,790 B2 | 10/2005 | Forslow |
| 7,106,756 B1 | 9/2006 | Donovan et al. |
| 7,130,904 B2 | 10/2006 | Kitchin |

(Continued)

FOREIGN PATENT DOCUMENTS

WO    0127644    4/2001

OTHER PUBLICATIONS

European Patent Office, Communication with Supplementary European Search Report, in Application No. 03797890.5, dated Dec. 10, 2010.

(Continued)

*Primary Examiner* — Melody Mehrpour
(74) *Attorney, Agent, or Firm* — Farjami & Farjami LLP

(57) ABSTRACT

Aspects of the invention may be found in a system and method for hardware acceleration in a hybrid wired/wireless local area network. In according with various embodiments of the invention, hardware acceleration may comprise creating at least one policy to be distributed among one or more of a plurality of access point groups. At least one policy may be associated with a particular one of the access point groups. The associated policy may be identified and distributed to one or more access points in an access point group. The distribution of the policy may be conditioned on the occurrence of an event. An identified policy may be distributed to a particular access point group upon occurrence of the event.

45 Claims, 18 Drawing Sheets

(56) References Cited

U.S. PATENT DOCUMENTS

| | | | |
|---|---|---|---|
| 7,246,165 B2 * | 7/2007 | Williams et al. | 709/225 |
| 7,444,510 B2 * | 10/2008 | Venkatachary et al. | 713/166 |
| 7,478,161 B2 * | 1/2009 | Bernet et al. | 709/228 |
| 8,068,479 B2 * | 11/2011 | Martin et al. | 370/351 |
| 2002/0018456 A1 | 2/2002 | Kakemizu et al. | |
| 2002/0022483 A1 | 2/2002 | Thompson et al. | |
| 2002/0069278 A1 | 6/2002 | Forslow | |
| 2002/0080754 A1 | 6/2002 | Travostino et al. | |
| 2002/0122422 A1 | 9/2002 | Kenney | |
| 2002/0157090 A1 | 10/2002 | Anton | |
| 2002/0191572 A1 | 12/2002 | Weinstein et al. | |
| 2003/0125028 A1 | 7/2003 | Reynolds | |
| 2003/0216141 A1 | 11/2003 | Antoniou et al. | |
| 2003/0235175 A1 | 12/2003 | Naghian et al. | |
| 2004/0215957 A1 | 10/2004 | Moineau et al. | |
| 2005/0117576 A1 | 6/2005 | McDysan et al. | |
| 2005/0185626 A1 | 8/2005 | Meier et al. | |

OTHER PUBLICATIONS

European Search Report corresponding to European Patent Application No. 04017785.9-1249, dated Apr. 13, 2020.

* cited by examiner

SYSTEM AND METHOD FOR HARDWARE ACCELERATION IN A HYBRID WIRED/WIRELESS LOCAL AREA NETWORK

CROSS-REFERENCE TO RELATED APPLICATIONS/INCORPORATION BY REFERENCE

This patent application is a continuation of U.S. patent application Ser. No. 10/657,942 filed Sep. 9, 2003, now U.S. Pat. No. 8,068,479 which also makes reference to, claims priority to, and claims the benefit of:
U.S. Provisional Patent Application Ser. No. 60/435,982 entitled "System and Method for Hardware Acceleration in a Wireless Local Area Network" filed on Dec. 20, 2002;
U.S. Provisional Patent Application Ser. No. 60/411,261 entitled "Communications Systems Software and Protocols" filed on Sep. 17, 2002;
U.S. Provisional patent Application Ser. No. 60/411,301 entitled "Method and System for Providing a Scalable Integrated Switch and Wireless Architecture" filed on Sep. 17, 2002; and
U.S. Provisional Application Ser. No. 60/435,984 entitled "Communication System and Method in a Wireless Local Area Network" filed on Dec. 20, 2002.
The above stated applications are all incorporated herein by reference in their entirety.

FIELD OF THE INVENTION

Embodiments of the present application relate generally to local area networks, and more particularly to a communication method and system for hardware acceleration in a hybrid wired/wireless local area network (WLAN).

BACKGROUND OF THE INVENTION

The Open Systems Interconnection (OSI) model promulgated by the International standards organization (ISO) was developed to establish standardization for linking heterogeneous computer and communication systems. The OSI model describes the flow of information from a software application of a first computer system to a software application of a second computer system through a network medium. FIG. 1a is a block diagram 100 of the OSI model. Referring to FIG. 1a, the OSI model has seven distinct functional layers including layer 7, an application layer 114; layer 6, a presentation layer 112; layer 5, a session layer 110; layer 4, a transport layer 108, layer 3, a network layer 106; layer 2: a data link layer 104; and layer 1, a physical layer 102. The physical layer 102 may further include a physical layer convergence procedure (PLCP) sublayer 102b and a physical media dependent sublayer 102a. The data link layer 104 may also include a Medium access control (MAC) layer 104a.

In general, each 081 layer describes certain tasks which are necessary for facilitating the transfer of information through interfacing layers and ultimately through the network. Notwithstanding, the OSI model does not describe any particular implementation of the various layers. OSI layers 1 to 4 generally handle network control and data transmission and reception, generally referred to as end-to-end network services. Layers 5 to 7 handle application issues, generally referred to as application services. Specific functions of each layer may vary depending on factors such as protocol and/or interface requirements or specifications that are necessary for implementation of a particular layer. For example, the Ethernet protocol may provide collision detection and carrier sensing in the physical layer. Layer 1, the physical layer 102, is responsible for handling all electrical, optical, opto-electrical and mechanical requirements for interfacing to the communication media. Notably, the physical layer 102 may facilitate the transfer of electrical signals representing an information bitstream. The physical layer 102 may also provide services such as, encoding, decoding, synchronization, clock data recovery, and transmission and reception of bit streams.

The PLCP layer 102b may be configured to adapt and map services provided by the physical layer 102 to the functions provided by the device specific PMD sublayer 102a. Specifically, the PLCP layer 102b may be adapted to map PHY sublayer service data units (PDSUs) into a suitable packet and/or framing format necessary for providing communication services between two or more entities communicating via the physical medium. The PMD layer 102a specifies the actual methodology and/or protocols which may be used for receiving and transmitting via the physical medium. The MAC sublayer 104a may be adapted to provide, for example, any necessary drivers which may be utilized to access the functions and services provided by the PLCP sublayer 102b. Accordingly, higher layer services may be adapted to utilize the services provided by the MAC sublayer 104a with little or no dependence on the PMD sublayer 102a.

802.11 is a suite of specifications promulgated by the Institute of Electrical and Electronics Engineers (IEEE), which provide communication standards for the MAC and physical (PHY) layer of the OSI model. The 801.11 standard also provides communication standards for wired and wireless local area networks (WLANs). More specifically, the 802.11 standard specifies five (5) types of physical layers for WLANs. These include, frequency hopping spread spectrum (FHSS), direct sequence spread spectrum (DSSS), infrared (IR) communication, high rate direct sequence spread spectrum spread spectrum (HR-DSS) and orthogonal frequency division multiplexing (OFDM). The 802.11 standard also provides a PLCP frame format for each of the specified PHY layers.

Over the past decade, demands for higher data rates to support applications such as streaming audio and streaming video, have seen Ethernet speeds being increased from about 1-2 megabit per second (Mbps), to 10 Mbps, to 100 Mbps, to 1 gigabit per second (Gbps) to 10 Gbps. Currently, there are four (4) standards in the in the suite of specifications, namely 802.11b, 802.11a and 802.11g which have been adapted to facilitate the demands for increased data rates. The 802.11g standard for example, may be adapted to provide a maximum data rate of about 54 Mbps at a transmitter/receiver range of 19 meters (m) in a frequency range of 2.4 GHz to 2.4835 GHz. The 802.11b standard for example, may be adapted to provide a maximum data rate of about 11 Mbps at a transmitter/receiver range of 57 meters (m) in a frequency range of 2.4 GHz to 2.4835 GHz. Finally, the 802.11a standard for example, may be adapted to provide a maximum data rate of about 54 Mbps at a transmitter/receiver range of 12 meters (m) in a 300 MHz segmented bandwidth ranging from 5.150 GHz to 5.350 GHz and from 5.725 GHz to 5.825 GHz.

The 802.11 standard forms the basis of the other standards in the suite of specifications, and the 802.11b, 802.11a and 802.11g standards provide various enhancements and new features to their predecessor standards. Notwithstanding, there are certain elementary building blocks that are common to all the standards in the suite of specifications. For example, all the standards in the suite of specifications utilize the Ethernet protocol and utilize carrier sense multiple access with collision avoidance (CSMA/CA).

CSMA/CD utilizes a simple negotiation scheme to permit access to a communication medium. If a transmitting entity wishes to transmit information to a receiving entity, the transmitting entity may sense the communication medium for communication traffic. In a case where the communication medium is busy, the transmitting entity may desist from making a transmission and attempt transmission at a subsequent time. In a case where the communication transmission is not busy, then the transmitting entity may send information over the communication medium. Notwithstanding, there may be a case where two or more transmission entities sense that the communication medium is not busy and attempt transmission at the same instant. To avoid collisions and retransmissions, a ready to send (RTS) and clear to send (CTS) messaging scheme is employed. Accordingly, whenever a transmitting device senses that the communication medium is not busy, then the transmitting device may send a ready to send message to one or more receiving device. Subsequent to the receipt of the ready to send message, the receiving device may send a clear to send message. Upon receipt of the clear to send message by the transmitting device, the transmitting device may initiate transfer of data to the receiving device. Upon receiving packets or frames from the transmitting device, the receiving device may acknowledge the received frames.

The 802.11b standard, commonly called Wi-Fi, which represents wireless fidelity, is backward compatible with its predecessor standard 802.11. Although 802.11 utilizes one of two modulation formats including direct sequence spread spectrum (DSS) using differential binary phase shift keying and frequency hopping spread spectrum (11-bit Barker sequence), 802.11b utilizes a higher data rate form of DSS called complementary code keying (CCK). CCK permits higher data rate and particularly less susceptible to interference effects such as multipath-propagation interference, the PSK.

The 802.11a protocol utilizes orthogonal frequency-division multiplexing (OFDM) modulation/encoding scheme, which provides a maximum data rate 54 Mbps. Orthogonal frequency-division multiplexing is a digital modulation technique which splits a signal into several narrowband channels, with each channel having a different frequency. Each narrowband channel is arranged so as to minimize the effects of crosstalk between the channels and symbols in the data stream.

Since equipment designed to provide support for 802.11a operates at frequencies in the ranges 5.150 GHz to 5.350 GHz and from 5.725 GHz to 5.825 GHz, 802.11a equipment will not interoperate with equipment designed to operate with the 802.11b standard which defines operation in the 2.4 to 2.4835 GHz frequency band. One major drawback is that companies that have invested in 802.11b equipment and infrastructure may not readily upgrade their network without significant expenditure.

The 802.11g standard was developed as an extension to 802.11b standard. The 802.11g standard may utilize a similar OFDM modulation scheme as the 802.11a standard and delivers speeds comparable with the 802.11a standard. Since 802.11g compatible equipment operates in the same portion of the electromagnetic spectrum as 802.11b compatible equipment, 802.11g is backwards compatible with existing 802.11b WLAN infrastructures. Due to backward compatibility of 802.11g with 802.11b, it would be desirable to have an 802.11b compliant radio card capable of interfacing directly with an 802.11g compliant access point and also an 802.11g compliant radio card capable of interfacing directly with an 802.11b compliant access point.

Furthermore although 802.11g compatible equipment operates in the 2.4 GHz to 2.4835 GHz frequency range, a typical transmitted signal utilizes a bandwidth of approximately 30 MHz, about a third or 30% of the total allocated bandwidth. This limits the number of non-overlapping channels utilized by an 802.11g access point to three (3). A similar scenario exists with 802.11b. Accordingly, many of the channel assignment and frequency reuse schemes associated with the 802.11b standard may be inherent in the 802.11g.

RF interference may pose additional operational problems with 802.11b band 802.11g equipment designed to operate in the 2.4 GHz portion of the electromagnetic spectrum. The 2.4 GHz portion of the spectrum is an unlicensed region which has been utilized for some time and is crowded with potential interfering devices. Some of these devices include cordless telephone, microwave ovens, intercom systems and baby monitors. Other potential interfering devices may be Bluetooth devices. Accordingly, interference poses interference problems with the 802.11b band 802.11g standards.

802.11a compatible equipment utilizes eight non-overlapping channels, as compared to three non-overlapping channels utilized by 802.11b. Accordingly, 802.11a access points may be deployed in a more dense manner than, for example 802.11b compatible equipment. For example, up to twelve access points each having a different assigned frequency may be deployed in a given area without causing co-channel interference. Consequently, 802.11a may be particularly useful in overcoming some of the problems associated with channel assignment, especially in areas that may have a dense user population and where increased throughput may be critical. Notwithstanding, the higher operating frequency of 802.11a causes more attenuation resulting in a shorter operating range at a given data rate. This may significantly increase deployment cost since a larger number of access points are required to service a given service area.

In hybrid wired/wireless network systems that may utilize one or more protocols in the 802.11 suite of protocols, the mobility of access devices throughout the network may pose additional challenges for conventional switches and switching equipment. Since access devices are continuously changing their point of access to the network, conventional switches may not have the capability to control other network devices and/or entities to provide a seamless and efficient communication throughout the network. In order to satisfy subscriber demands, certain quality and minimum service standards have to be maintained by a network system. For example, subscribers may expect to be connected at least 99.9% of the time when they attempt or initiate a connection. Additionally, subscribers may be willing to accept a minimal delay of a few milliseconds whenever they may be engaged in a voice call. However, operating outside the realm of acceptable standards may significantly affect customer satisfaction and loyalty. Notwithstanding, maintaining acceptable standards may be challenging in a continuously changing network. Moreover, particularly in network systems that may handle large volumes of access device traffic, conventional switching equipment may not have the necessary resources to effectively ensure and maintain acceptable standards. Additionally, since access devices may be continuously mobile throughout the network, congestion may cause various network devices to become bottlenecks, while other network devices having available capacity may remain unutilized or underutilized. Furthermore, overload can sometimes result in performance degradation and ultimately, system failure.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

Aspects of the invention may be found in a method and system for hardware acceleration in a hybrid wired/wireless local area network. A method for hardware acceleration may comprise the step of creating at least one policy to be distributed among one or more of a plurality of access point groups. A method for hardware acceleration may further comprise the step of detecting at least one client movement from one access point groups to another, and distributing associated policy among one or more of a plurality of access point groups. At least one policy may be associated with a particular one of the access point groups. The associated policy may be identified and distributed to one or more access points in an access point group. The distribution of the policy may be conditioned on the occurrence of an event. Accordingly, an identified policy may be distributed to a particular access point group upon occurrence of the event.

At least one policy may be associated with a particular access point in a particular access point group. Accordingly, the policy may be distributed to the particular access point in a particular access point groups. The policy may be communicated from a switch and/or a server. In another aspect of the invention, the policy may be broadcasted from the switch and/or server to a portion of the access point groups. A messaging protocol message may be used to distribute the policy.

Another embodiment of the invention may provide a machine readable storage, having stored thereon a computer program having at least one code section for hardware acceleration, the at least one code section being executable by a machine for causing the machine to perform the steps described above.

Another embodiment of the invention may also provide a system for hardware acceleration in a hybrid wired/wireless local area network. A system for hardware acceleration may comprise at least one processor for creating at least one policy to be distributed among one or more of a plurality of access point groups. The processor may further detect at least one client movement from one access point groups to another access point group and accordingly distribute associated policy among one or more of a plurality of access point groups. The at least one processor may associate the policy with a particular one of the access point groups. After identification of the policy, a transmitter may distribute the policy to one or more access points in an access point group. The processor may be adapted to condition the distribution of the policy on the occurrence of an event. Accordingly, the transmitter may distribute the policy to a particular access point group upon occurrence of the event.

The processor may be further adapted to tunnel frames received by an access point according the associated policy to another access point by encapsulating frames in hardware to the destination access point groups or destination switch. The processor associated with the destination may then decapsulate the frame and deliver it to at least one client. Accordingly, the original intended receiver may receive the frame from the new accesses point group where client resides.

The processor may be further adapted to associate the policy with a particular access point in a particular access point group. Accordingly, the transmitter may be instructed by the processor to distribute the policy to the particular access point in the particular access point group. The policy may be transferred from a switch and/or a server. In another aspect of the invention, the transmitter may be adapted to broadcast the policy from the switch and/or server to at least a portion of the access point groups in the hybrid wired/wireless network. The policy may be encapsulated in a messaging protocol message which may be used to distribute the policy from the switch and/or server to the access point groups.

These and other advantages, aspects and novel features of the present invention, as well as details of an illustrated embodiment thereof, will be more fully understood from the following description and drawings.

DETAILED DESCRIPTION OF THE INVENTION

Wireless Local Area Networks (WLANs) are gaining popularity as the method of networking users in, for example, an enterprise. WLANs may provide various advantages over conventional wired LANs, including for example, user mobility, ease of installation, seamless transition between enterprises and/or telecom provider environments and connectivity in public places such as airports, libraries and conferences. Some existing WLAN solutions are intended for use in limited installations such as a home or small office. However, they are still lacking in many areas when deployment in large enterprises may be required. For example, system performance needs to be enhanced to facilitate real-time operation. Accordingly, an aspect of the invention provides a communication system and method for hardware acceleration in a wireless local area network In, for example, large heterogeneous networks such as an Enterprise network, there may be hundreds of access points that may require management. Each one or a group of the access points may be required to implement certain policies. The policies may include, but are not limited to, access policies, security policies and/or quality of service (QoS) policies. Individually managing each one or a group of the access points may be a daunting task that may be expensive and/or time consuming. In accordance with an aspect of the invention, a centralized server and/or a switch may be adapted to implement the policies for each of the APs, a group of APs or all of the APs. Accordingly, the server and/or switch may propagate the polices to the access points. In this regard, the server and the switch may provide a single point for implementing and distributing the policies. The switch may be a wireless local area network switch although the invention is not limited in this regard.

Aspects of the invention may provide a system and method for hardware acceleration in a hybrid wired/wireless local area network. Hardware acceleration may comprise creating at least one policy to be distributed among one or more of a plurality of access point groups. At least one policy may be associated with a particular one of the access point groups. The associated policy may be identified and distributed to one or more access points in an access point group. The distribution of the policy may be conditioned on the occurrence of an event. An identified policy may be distributed to a particular access point group upon occurrence of the event.

Figure 1A:
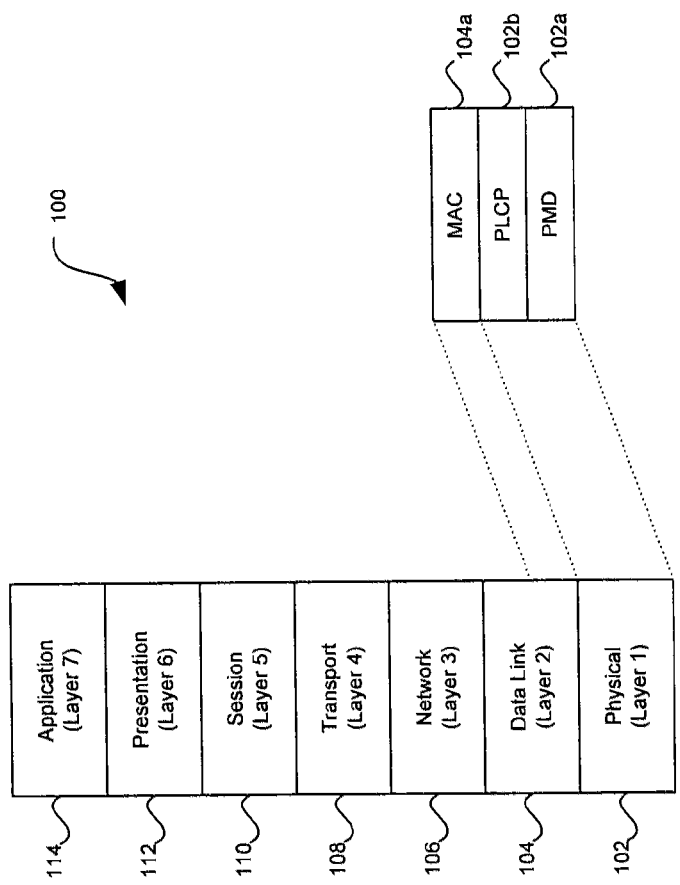
FIG. 1a is a block diagram of the OSI model.
Figure 1B:
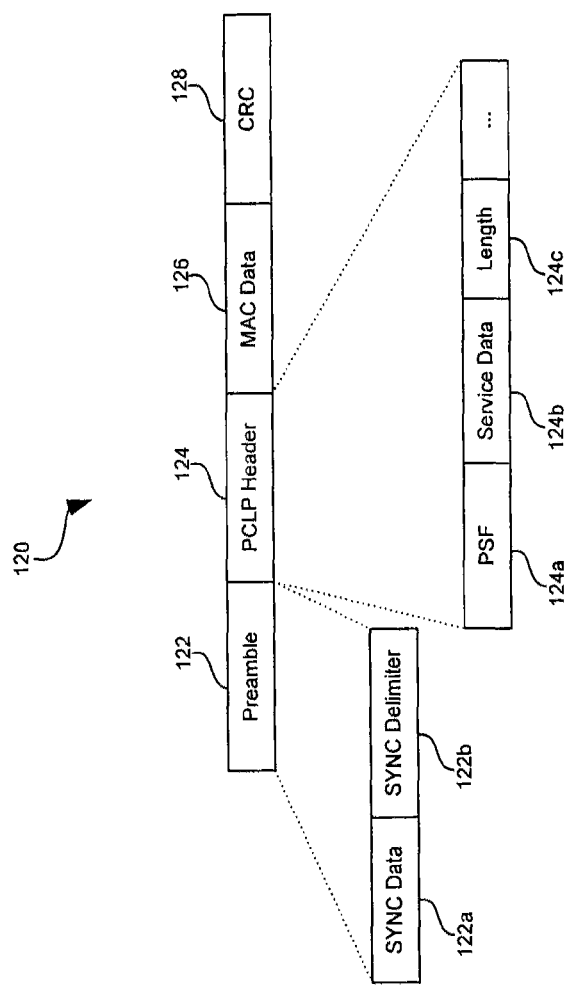
FIG. 1b is a block diagram illustrating a general PLCP frame as defined by 802.11.

FIG. 1b is a block diagram 120 illustrating a general PLCP frame as defined by 802.11. Referring to FIG. 1b, there is shown preamble 122, PLCP header 124, MAC data 126, and CRC 128. Preamble 122 may comprise synchronization (SYNC) data 122a and synchronization delimiter 122b. The PLCP header 124 may comprise, for example PCLP signal field (PSF) 124a, service data 124b, length 124c and other fields. The preamble 122 may be dependent on the PHY. The SYNC data 122a may comprise a unique bit stream that may be adapted to signal timing parameters such as the start of a frame. The SYNC data 122a is used for bit synchronization and demodulation. The SYNC delimiter 122b provides frame timing information and may be adapted to delimit the end of synchronization information. The PLCP header 124 may be adapted to contain information used for decoding the frame. For example, the PSF 124a may be adapted to include communication data rate information. The service data 124b is generally reserved. but may be utilized to provide application specific functionality. The length 124c may be adapted to indicate the length of the MAC data 126. In this regard, the length 124c may be expressed in terms of the time required to transmit the MAC data 126.

Figure 1C:
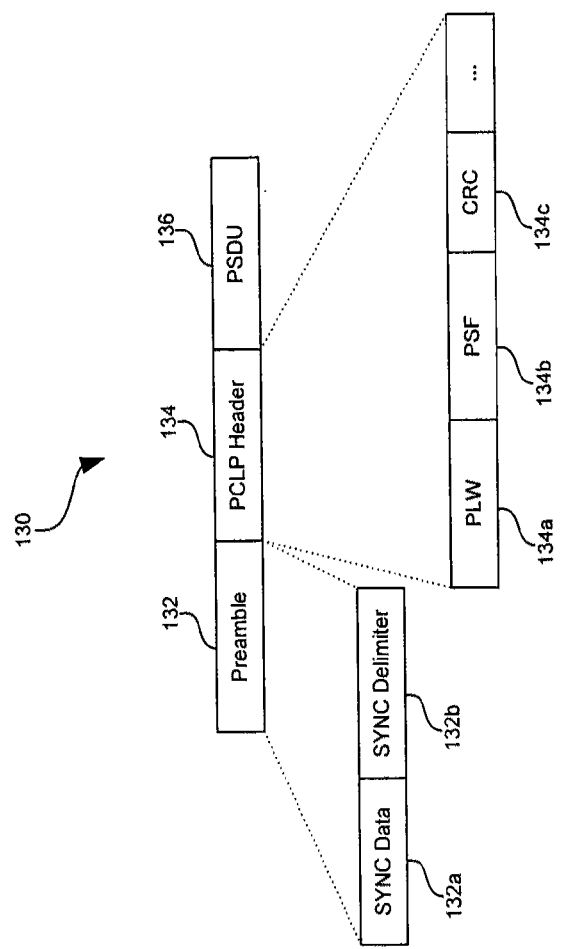
FIG. 1c is a block diagram illustrating a PLCP frame utilized by frequency hopping spread spectrum as defined by 802.11.

FIG. 1c is a block diagram 130 illustrating a PLOP frame utilized by frequency hopping spread spectrum as defined by 802.11. Referring to FIG. 1c, there is shown a SYNC data 132, PLCP header 134 and PSDU 136. The PLCP header 134 may comprise, for example. PSDU length word (PLW) 134a, PLOP signaling field (PSF) 134b, header error check field or CRC 134c and other fields. The PLW 134a may specify the number of octets contained in the PSDU 136. The PSF 134 be may be 4-bits in length and may be used to denote the communication data rate.

Figure 1D:
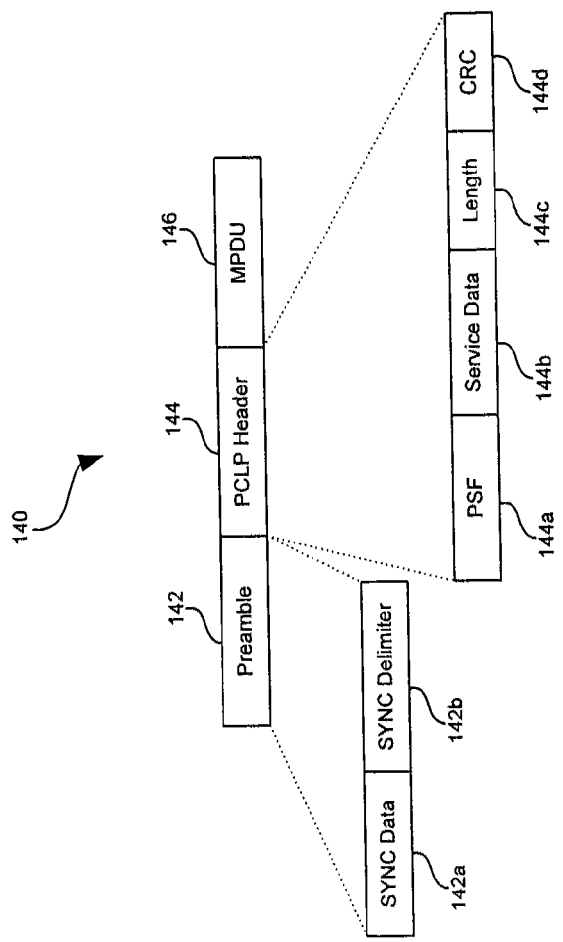
FIG. 1d is a block diagram illustrating a PLCP frame for direct sequence spread spectrum and high rate direct sequence spread spectrum as defined by 802.11.

FIG. 1d is a block diagram 140 illustrating a PLCP frame for direct sequence spread spectrum and high rate direct sequence spread spectrum (HR-DSS) as defined by 802.11. Referring to FIG. 1d, there is shown preamble 142, PLCP header 144 and MPDU 146. Preamble 142 may comprise synchronization (SYNC) data 142a and synchronization delimiter 142b. The PLCP header 144 may comprise PCLP signal field (PSF) 144a, service data 144b, length 144c, and CRC field 144d. The SYNC data 142a may be 128 bits as compared to 8 bits for SYNC data 132a for frequency hopping spread spectrum. The CRC 144d is 16 bits, which is similar to CRC 134c for frequency hopping spread spectrum.

Figure 1E:
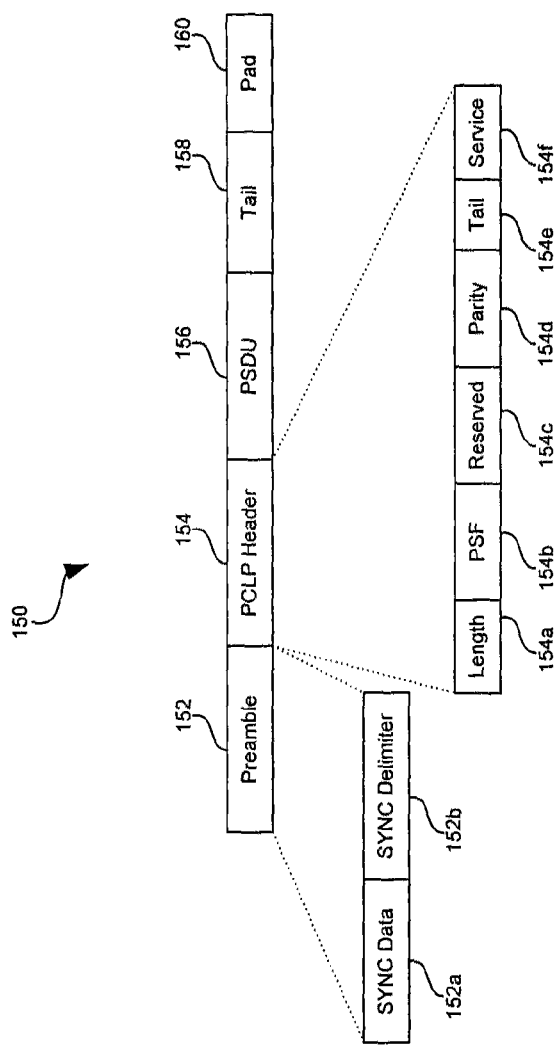
FIG. 1e is a block diagram illustrating a PLCP frame for orthogonal frequency division multiplexing as defined by 802.11.

FIG. 1e is a block diagram 150 illustrating a PLCP frame for orthogonal frequency division multiplexing as defined by 802.11. Referring to FIG. 1e, there is shown preamble 152, PLCP header 154 and PSDU 156, tail 158 and pad 160. Preamble 152 may comprise synchronization (SYNC) data 152a and synchronization delimiter 152b. The PLCP header 154 may comprise length 154a, PCLP signal field (PSF) 154b, reserved field 154c, parity 154d, tail 154e and service 154f. The length 154a is a 12-bit field that may be adapted to indicate the length of the frame. The PSF 154b is a 4-bit field that may indicate a modulation scheme utilized and its associated coding rate of the PSDU. For example, the specification utilizes binary 1011 to represent 6 Mbps, 1111 to represent 9 Mbps, 1010 to represent 12 Mbps, 1110 to represent 18 Mbps, 1001 to represent 24 Mbps, 1011 to represent 36 Mbps, 1000 to represent 48 Mbps and finally, 1100 to represent the maximum standardized rate if 54 Mbps. The reserved field 154c is a 1 bit field that is reserved for future use and may be adapted for application specific use. The parity field 154d may indicate odd or even parity. The tail field 154e is a 6-bit field. The service field 154f is a 16-bit field that may be adapted to indicate the type of service.

In a typical wireless local area network, especially as access devices become mobile throughout the network, channel capacity may be rapidly time varying. For example, when the distance from an access device to an access point increases or decreases due to mobility, the channel capacity and ultimately the channel throughput may change with time. In accordance with an embodiment of the invention, a switch is provided to facilitate communication between one or more of a plurality of access devices and/or access points, and/or other switches. The switch may utilize a messaging protocol, which may be adapted to facilitate tasks such as, hardware acceleration, access point aggregation and resiliency, switch filter transfer, bandwidth management, session control and management, load balancing and/or QoS control and management.

Referring to the task of hardware acceleration, in a hybrid wired/wireless LAN in which bandwidth usage may be rapidly changing over time due to the mobility of access devices, the switch, in accordance with an aspect of the invention, may be configured to provide hardware acceleration for a wired and/or a wireless portion of the network. The task of hardware acceleration may operate dependently or independently of activities including, but not limited to, access point aggregation and resiliency, allocating and de-allocating bandwidth, implementing policies, tracking bandwidth usage and adapting bandwidth allocation to meet user demands and system capability. The management of these activities may be directly or indirectly related to providing mobility and operability throughout a wired or wireless LAN, or a hybrid combination thereof.

Figure 2:
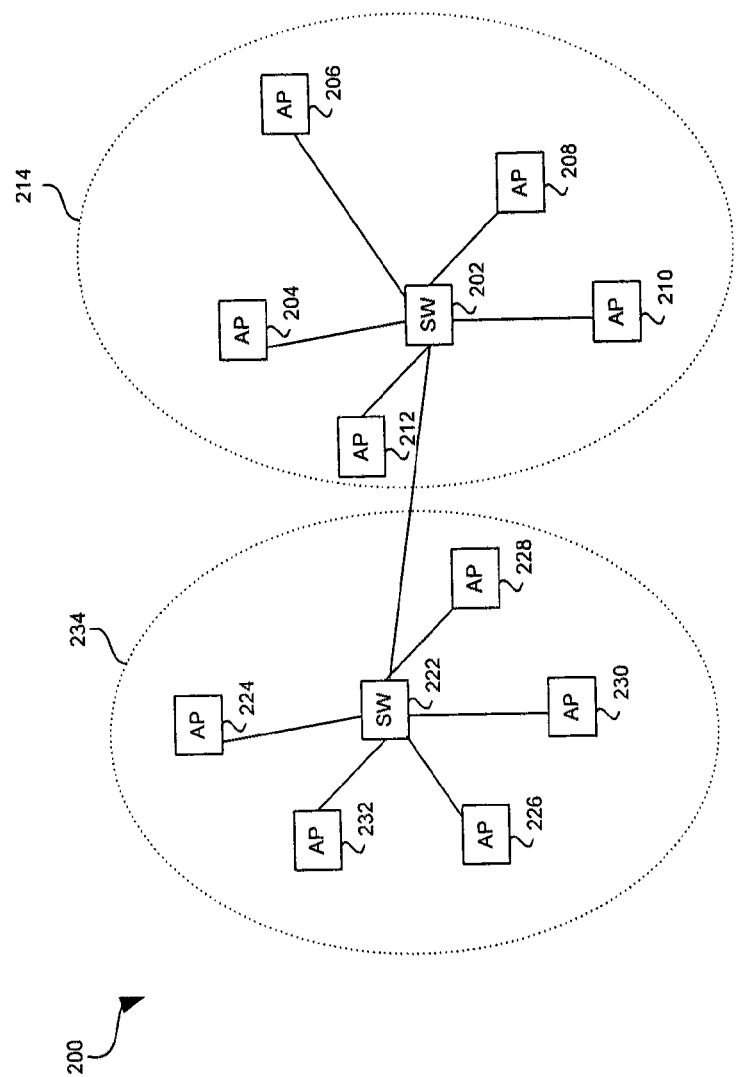
FIG. 2 is a block diagram of an exemplary wireless local area network in accordance with an embodiment of the invention.

FIG. 2 is a block diagram of an exemplary wireless local area network in accordance with an embodiment of the invention. Referring to FIG. 2, there is illustrated a first networking domain 214 and a second networking domain 234. The first networking domain 214 may comprise a switch 202, and access points 204, 206, 208, 210,212. Each of access points 204, 206, 208, 210, 212 may be coupled to the switch 202. The second networking domain 234 may comprise a switch 222, and access points 224, 226, 228, 230, 232. Each of access points 224, 226, 208, 230, 232 may be coupled to the switch 222. Switch 222 may be coupled to switch 202 through anyone or more of a wired and a wireless medium. Although not shown, at least some of the access points in anyone of the networking domains 214, 234 may be coupled to each other. Notwithstanding, a plurality of actual and/or virtual channels may be provided to facilitate communication with the access points and switches. Although the networking domains 214 and 234 are illustrated as separate networking entities, the invention is not so limited. Accordingly, the networking domain 214, 234 may be part of a single networking entity, but may represent separate security domains within the single networking entity.

In operation, anyone or more of the switches 202, 222 may be adapted to send network management related information and parameters to anyone or more of the access points in anyone or more of the networking domains 214, 234. In one embodiment of the invention, for example, switch 202 may be adapted to communicate bandwidth information to access point 206. Similarly, switch 202 may be adapted to send network management related information to anyone or more of access points 204, 208, 210, 214. Similarly, switch 222 may be adapted to communicate network management related information to anyone or more of access points 224, 226, 228, 230, 232. The bandwidth information and/or network management related information may be used by an access point to efficiently allocate and/or de-allocate bandwidth for associating and/or dissociating access devices.

The switches 202, 222 may be adapted to provide, for example, certain QoS management activities to the access points using for example a messaging protocol. Accordingly, some activities such as bandwidth policing, bandwidth management, load balancing, roaming and handover may be handled by coordinating one or more switches and one or more access points utilizing, for example, the messaging protocol. Notwithstanding, a switch for example. switch 222, may be configured to establish rules that may be adapted by the access points 224, 226, 228, 230, 232 in carrying out these activities. The rules may be propagated from the switches 222, 202 to the access points 204, 208, 210, 214, 224, 226, 228, 230, 232 using, for example, the messaging protocol.

Prioritization and processing, for example, may be based on acceptable levels of latency and bandwidth availability. For example, an IP telephone call may be assigned highest queuing and processing priority in order to minimize latency. Policing, for example, may comprise performing activities which may limit and control the usage of available bandwidth by a particular access device or a type of access device. These and other tasks may be controlled by the switch using the messaging protocol. Although activities such as policing, bandwidth and QoS management, and access point aggregation and resiliency may be conducted independently of hardware acceleration, in accordance with an aspect of the invention, information may be interchanged among the various activities to facilitate hardware acceleration.

In operation, anyone or more of the access points in anyone or more of the networking domains may be adapted to acquire various bandwidth related information, and parameters and communicate the bandwidth related information to one or more of the switches 202, 222. For example, access point 206 may be adapted to acquire various bandwidth related information and communicate the acquired information back to the switch 202. Similarly, anyone or more of access points 204, 208, 210, 214 may acquire various bandwidth related information and parameters and communicate the acquired information to switch 202. In another aspect of the invention, anyone or more of access points 224, 226, 228, 230, 232 may acquire various bandwidth related information and parameters and communicate the acquired information to the switch 222.

Anyone or more of access points 224, 226, 228, 230, 232 may acquire various bandwidth related information and parameters and communicate the acquired information to the switch 202 through switch 222. This may be particularly useful in, for example, a roaming scenario or handoff scenario. In both the roaming and handoff scenarios where a particular access device is roaming or being handed off from networking domain 234 to networking domain 214, it may be advantageous to acquire bandwidth related information pertaining to networking domain 214 before permitting an access device to acquire service from networking domain 214. In this case, switch 222 may initiate a query requesting bandwidth related information from switch 202. Consequently, switch 214 may request bandwidth related information from anyone or more of access points 204, 206, 208, 210, 212. Once switch 202 gets the bandwidth related information from these access points, it may communicate the information to the switch 222. Accordingly, the switch 222 may decide whether to handoff or permit roaming depending on the bandwidth related information received from the switch 202.

Based on bandwidth related information received from one or more access devices or switches, a switch may be adapted to force an access device to roam. For example, in a case where the switch determines that there may be insufficient bandwidth or channel capacity, then the switch may be adapted to dynamically force existing and/or new incoming access devices to roam. In one aspect of the invention, a list of devices which have been forced to roam may be maintained. Accordingly, if a switch determines that there is sufficient channel capacity available, then the switch may be adapted to signal or notify devices on the list to reattempt establishment of service and permit access to the service provided by the network. In this regard, any one or more of the switches 202, 222 may be adapted to determine the total available bandwidth for anyone or more of a plurality of access points and/or switches. Accordingly, the switches 202 and/or 222 may provide channel/frequency management and quality of service (QoS) management in order to optimize bandwidth utilization for a plurality of access devices.

Based on various bandwidth related information, an access prioritization scheme may be adapted and enforced by, for example, anyone or more of the switches 202, 222. The prioritization scheme may comprise, establishing a priority for all network traffic, honoring prioritized traffic from all clients, and/or honoring prioritized traffic from some select clients such as trusted clients. In another aspect of the invention, the switches 202, 222 may be adapted to provide certain QoS management activities to the access points. Accordingly, some activities such as bandwidth policing, bandwidth management, packet prioritization and processing, and service type queuing may be handled by an access point. Notwithstanding, a switch may be adapted to establish rules that may be utilized by the access points in carrying out these activities. Prioritization and processing, for example, may be based on acceptable levels of latency and bandwidth availability. For example, an IP telephone call may be assigned highest queuing and processing priority in order to minimize latency. Policing, for example, may comprise tasks which limit and control the usage of available bandwidth by a particular access device or a type of access device.

The switch may utilize the messaging protocol (MP) to provide enhanced communication services to one or more of a plurality of access devices or mobile stations in, for example, an enterprise Wireless LAN (WLAN). The enhanced communication, in addition to ordinary WLAN device communication such as authentication, authorization, key exchanges, beacon broadcast, etc., may provide additional features not provided by a WLAN to its clients. These additional features may include, but are not limited to, bandwidth management, access control, load balancing, network management and quality of service. In addition to switches, other enterprise WLAN devices that may utilize messaging protocol message transactions may include but are not limited to, wireless access points, enterprise switches and wireless stations. These devices may be messaging protocol enabled in certain instances.

In accordance with an aspect of the invention, an exemplary WLAN Architecture may be provided. In the enterprise Wireless LAN environment, the wireless devices may be located at the edge of the network. The wireless devices may be connected or coupled to the enterprise network via the one or more access points, which in turn may be the edge devices of, for example, a wired LAN. The access points may be connected to the LAN via switches. These switches, which may be called wireless LAN switches, and in certain instances, may not only perform Layer 2 switching, but may be adapted to function as a wireless edge manager. They may also provide additional functionalities such as hardware acceleration, access point aggregation and resiliency, bandwidth management, access control, firewall functions, traffic privacy and quality of service (QoS), network management, and load balancing.

Figure 3:
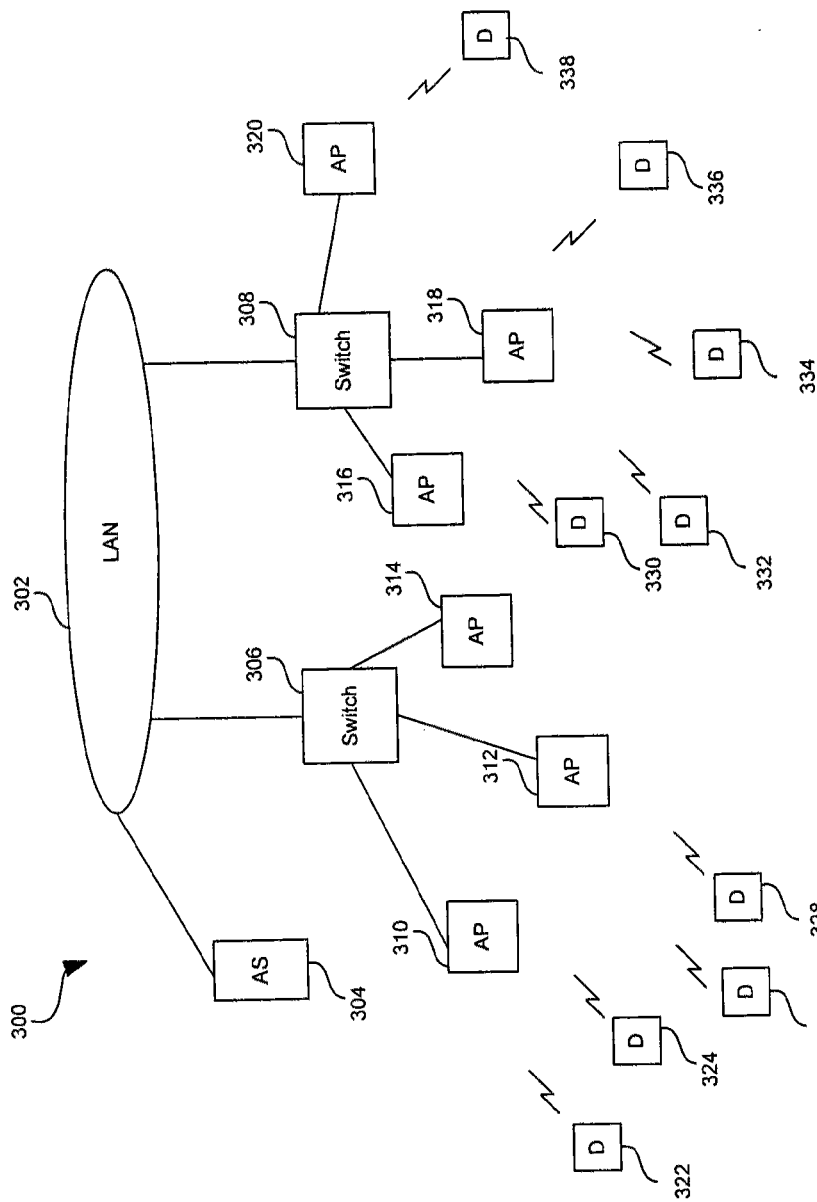
FIG. 3 block diagram of an exemplary Enterprise Wireless LAN having switches serving as the edge managers in accordance with an embodiment of the invention.

FIG. 3 is a block diagram 300 of an exemplary Enterprise Wireless LAN having switches serving as the edge managers in accordance with an embodiment of the invention. Referring to FIG. 3, there is shown, a local area network (LAN) 302, authentication server 304, switches 306, 308, access points (APs) 310, 312, 314, 316, 318, 320 and access devices 322, 324, 326, 328, 330, 332, 334, 336, 338. It should be recognized that the invention is not limited to an Enterprise WLAN. The invention may be applicable to a wired LAN, a wireless LAN and any combination thereof.

Wireless transmission or communication between the access devices or clients, and the access points may be secure. This may be also be true for the wired connections between any of the access points 310, 312, 314, 316, 318, 320 and the switches 306, 308. The switches 306, 308 and access points 310, 312, 314, 316, 318, 320 may be adapted to communicate using, for example, an Ethernet protocol. From the switch's perspective, the switch may be switching regular layer 2 frames. However, within the switch, knowledge of a WLAN and its management intelligence may reside primarily in software. Notwithstanding, the invention is not limited in this regard.

Figure 4:
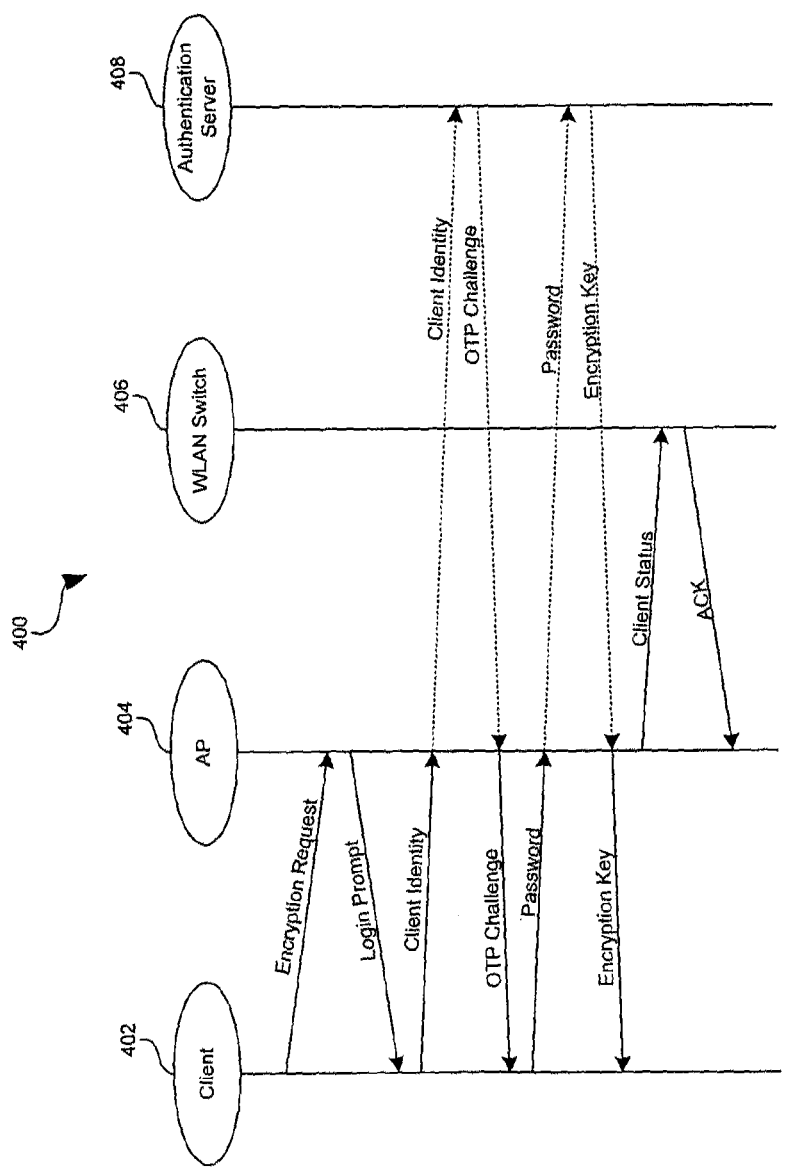
FIG. 4 illustrates an exemplary session initiation in accordance with an embodiment of the invention.

FIG. 4 illustrates an exemplary session initiation 400 in accordance with an embodiment of the invention. Referring to FIG. 4, the session initiation may include interaction between one or more of a client 402, an access point (AP) 404, a WLAN switch (WS) 406 and an authentication server (AS) 408. Prior to the session initiation, the AP 402 may have broadcasted beacon frames to some or all wireless device in its vicinity to announce its presence and its MAC address. Any client device attempting to connect may therefore know where to send a request.

Referring to FIG. 4, the client 402 may send a connection request to AP 404. The AP 404 may determine that client 402 is a new client initiating a new session and send a login prompt to the client 402. The client 402 may respond with its identity. The AP 404 may send its identity to the AP and the identity may be forwarded to the AS 408. The AS 408 may respond with a One-Time Password (OTP) challenge. The AP 404 may send an OTP challenge to client 402. The client 402 may respond to AP 404 with a password. The AP 404 may send the client password to AS 408. Upon successful authentication by the AS 408, AS 408 may respond with an encryption key. The AP 404 may pass the encryption key to the client 402. The AP 404 may also pass client status information, such as identity and/or MAC address, to the WS 406. WS 406 may, for example, enable additional access control for the client 402. Enabling access control may include, but is not limited to, information such as subnet information, time or duration, location information, and/or QoS. The WS 406 may send an acknowledgement (ACK) to the AP 404. In one aspect of the invention, the ACK and the client status may be sent using a messaging protocol (MP) message. The other messages may be sent using, for example, an extensible authentication protocol (EAP). The EAP from 802.1x suite of protocols may be utilized for session authentication, and the MP may facilitate communication between the AP 404 and WLAN switch 406. WS 406 may be adapted to request data for some or all sessions currently associated with an AP.

Figure 5:
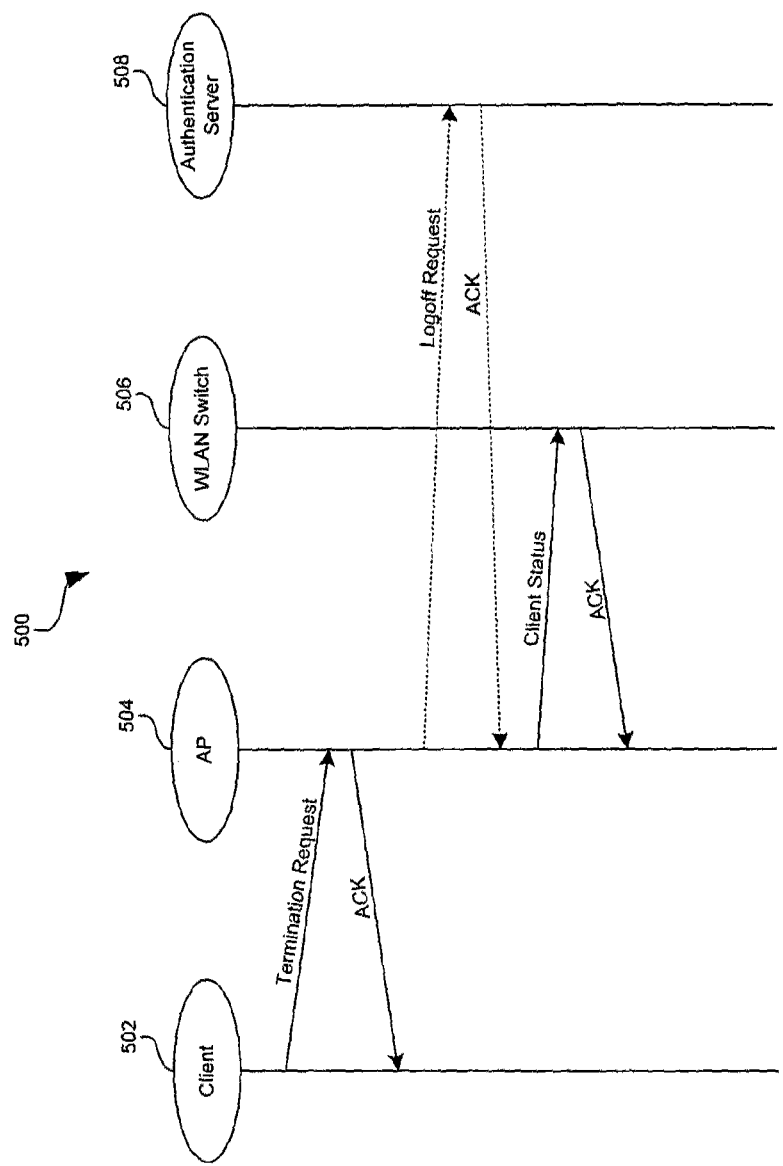
FIG. 5 illustrates an exemplary session termination in accordance with an embodiment of the invention.

FIG. 5 illustrates an exemplary session termination 500 in accordance with an embodiment of the invention. Referring to FIG. 5, the session termination may include interaction between one or more of a client 502, an access point (AP) 504, a WLAN switch (WS) 506 and an authentication server (AS) 508. The session termination may occur as a client logoff procedure, an idle session termination, access policy violation termination or by an act initiated by for example, a network administrator.

Referring to FIG. 5, the client 502 may send a logoff request to AP 504. The AP 504 may acknowledge the request with an ACK. The AP 504 may send a logoff request to the AS 508. The AS 508 may also respond with an ACK. The AP 504 may send a client status of logoff to the WS 506. The WS 506 may send and ACK to the AP 504. The WS 506 may cleanup any session information established for the client 502. In one aspect of the invention, the ACK and the client status may be sent using the messaging protocol (MP). The other messages may be sent using, for example, an extensible authentication protocol (EAP). The EAP from 802.1x may be utilized for session authentication, and the MP may facilitate communication between the AP 504 and WLAN switch 506. WS 506 may be adapted to request data for some or all communication sessions currently associated with an AP.

A handoff may be a pseudo session initiation/termination, but without a need for authentication. Handoff may be triggered by detection of a strong new signal and degradation of an old signal, in addition to receiving a broadcast beacon of a new AP. In an Enterprise WLAN, for example, there may be two types of handoff, namely intra-switch which may involve handoff between two APs that may be connected to the same WLAN switch, and inter-switch handoff which may involve handoff between two APs that may be connected to different WLAN switches. Inter-switch handoff may involve transferring information between the two switches.

Figure 6:
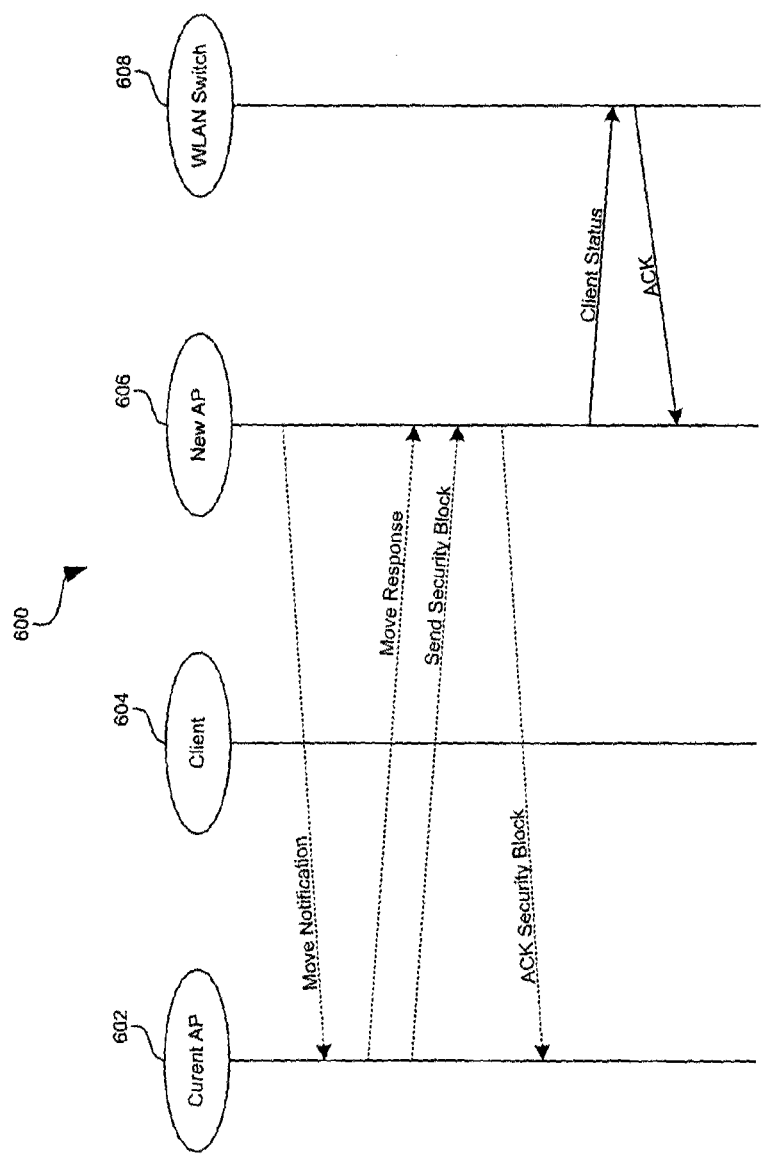
FIG. 6 illustrates an exemplary intra-switch handoff scenario in accordance with an embodiment of the invention.

FIG. 6 illustrates an exemplary intra-switch handoff scenario 600 in accordance with an embodiment of the invention. Referring to FIG. 6, there is shown an current access point (AP) 602, a client 604, a new access point (AP) 606, and a switch 608. In operation, client 604 may send a request to current AP 602 for disassociation from AP 602 and association with new AP 606. The new AP 606 may send a Move Notification message to the current AP 602. The current AP 602 may respond with a Move Response message which may comprise Session Context. The current AP 602 may also send the client's 604 security related data which may include, bit is not limited to, an encryption key to the new AP 606. The new AP 606 may acknowledge with for example, an acknowledgement of the security block with for example, an ACK Security Block message. The new AP 606 may send client status information which may comprise handoff information to WLAN Switch 608. The WLAN switch 608 may transfer switching information from one port connecting the current AP 602 to another port which now connects the new AP 606. In one aspect of the invention, the client status and ACK messages may be messaging protocol messages.

Figure 7:
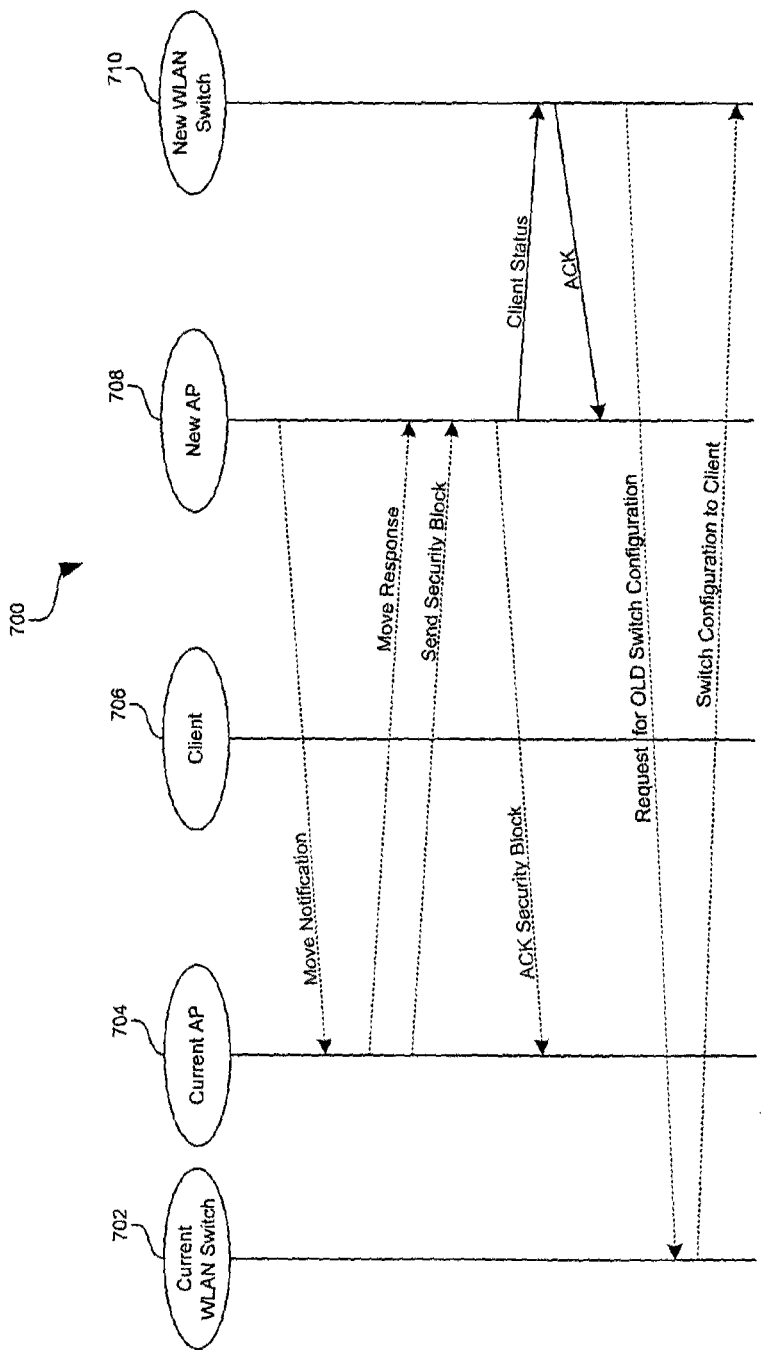
FIG. 7 illustrates an exemplary inter-switch handoff scenario in accordance with an embodiment of the invention.

FIG. 7 illustrates an exemplary inter-switch handoff scenario 700 in accordance with an embodiment of the invention. Referring to FIG. 7, there is shown an current WLAN switch 702, an current access point (AP) 704, a client 706, a new access point (AP) 708, and a new WLAN switch 710. In operation, client 706 may send a request to the current AP 704 for disassociation from current AP 704 served by current switch 702 and for an association with the new AP 708 served by the new switch 710. The new AP 708 may send a notification message such as a Move Notification message to the current AP 704. The current AP 704 may respond with a message such as a Move Response with a session context. The current AP 704 may send security data for client 704, for example an encryption key, to the new AP 708. The new AP 708 may acknowledge with an ACK message. The new AP 708 may send client status data for handoff to the new WLAN switch 710. The new WLAN switch 710 may issue a request for switch configuration for client 706 from current WLAN switch 702. The current WLAN switch 702 may respond with at least the requested switch configuration for client 602. The new WLAN switch 710 may be adapted to enable switching intelligence, which may include, but is not limited to, QoS, access policy for the client 706. In one aspect of the invention, the client status, request for switch configuration, switch configuration and the ACK message sent from the new AP 708 to the new WLAN switch 710 may be messaging protocol messages.

In certain respects, operation of a wireless IP phone may be similar to the operation of a wireless laptop computing application. However, there may also be differences. One difference may involve a requirement for no login or password when a mobile IP phone is powered on. A mobile IP telephone may be adapted to be ready to dial after it goes through its power up sequence and initialization. In this regard, authentication may be done implicitly based on, for example, a MAC address. In another aspect, a mobile IP telephone may not require an off-hook/dial tone state like a conventional wired IP phone. Wireless IP phones may travel or roam from a first zone to a second zone whether the phone in merely powered on or whether the IP phone is active on an actual call. An actual call may comprise a data call, video call and a voice call, or any combination thereof. In both instances, the wireless IP phone may correspond to an active session of the wireless laptop computer. While a "powered-on but not-in-use" IP phone may be handled with a slight delay in handoff, a live conservation may require seamless handoff with minimal delay. A WLAN that supports an IP phone may also comprise an IP Phone Gateway (IPG) which may be adapted to switch calls. The IPG may be a server or an IP PBX located within the WLAN. It may comprise an interface that may be adapted to connect a call if a called party or device is located within the Public Switched Telephone Network (PSTN).

In one embodiment of the invention, a call connection and a call termination call sequence may be provided. The call connection or the call termination may be initiated by either a party at the ends of the call. The type of station at the ends of a call may be irrelevant in certain cases. The type of station may be a PSTN device, an IP phone inside a corporation, an wireless IP phone outside the corporation, a POTS phone within the corporate PBX, or another IP phone within the same WLAN. In a case where a number or directory number (ON) is an internal ON, either an extension of a legacy PBX, an internal IP phone, or an internal wireless IP phone, a 5-digit number may be utilized for dialing. The 5-digit number may start with, for example, a pre-determined prefix followed by a 4-digit extension. In a case where the ON may be an external ON, either a ON in the PSTN or a ON in an external IP phone network, an E.164 standard ON format may be utilized. The E.1640N may be a 10-digit number starting with an area code, or a 7-digit number with no area code. In either case, the ON may preceded by a dial-out prefix, which may be, for example, the digit '9' as configured in most corporate PBXs. Notwithstanding, the invention is not limited in this regard and other numbers and/or digits may be used.

The following is an exemplary session initiation for a wireless IP phone to the Wireless LAN. Prior to initiation, the AP may broadcast beacon frames to one or more wireless devices in its vicinity to announce its presence and its MAC address. As part of the session initiation, a password may or may not be required when the IP phone is powered on. The client device or IP phone may send a connection request to the AP. The AP may determine that the client device is a new client device and may send a request to the IP phone to supply its identity. The IP phone may respond with its identity, such as a ON. The AP may send the identity of the client device to an authentication server. Upon successful authentication, the authentication server may send an encryption key to the client device. The AP may also pass information such as client status, which may include, but is not limited to the client's identity and MAC address, to a WLAN switch. Optionally, the authentication server may respond with a One-Time Password (OTP) challenge. The AP may send an OTP challenge to the IP phone. The IP phone may respond to the AP with a password. The AP may pass the IP phone password to the authentication server. In the case a where a password may be required, the message exchange sequence during session initiation may be similar to FIG. 4.

In another aspect of the invention, a call initiation scenario may also be provided. In this regard, a voice over Internet protocol (VoIP) may be utilized and at least some of the messages exchanged may be Layer 5 VoIP protocol messages, which may be transported over TCP/IP or UOP/IP. The VoIP protocol may be, but is not limited to, H.323, H.248 (MGCP) and SIP.

Figure 8:
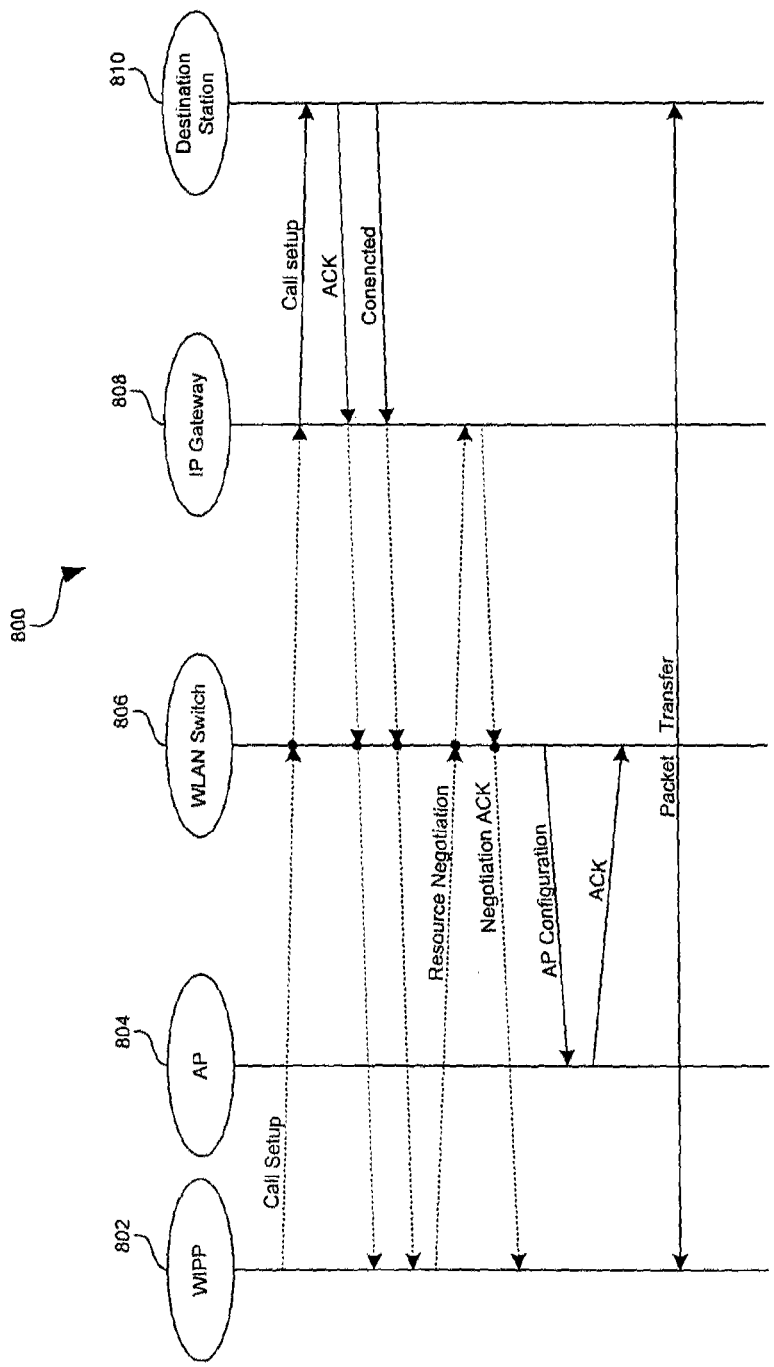
FIG. 8 is an exemplary call initiation scenario in accordance with an embodiment of the invention.

FIG. 8 is an exemplary call initiation scenario 800 in accordance with an embodiment of the invention. Referring to FIG. 8, there is shown a wireless IP phone (WIPP) 802, an access point 804, a WLAN switch (WS) 806, and IP gateway (IPG) 808 and a destination station (OTSA) 810. The WIPP 802 may initiate the call. The WIPP 803 may send a call setup request connection attempt to an internal extension or E.164 ON to the IPG 808. The IPG may determine whether the ON may be an internal IP phone ON or a legacy phone ON. Accordingly, the IPG 808 may map the ON to either an IP address or a legacy phone ON. The IPG 808 may send a connection request to the OSTA 810. The IPG 808 may also send a connection status to the WIPP 802. The WIPP 802 may generate a ringing tone. The IPG 808 may receive an off-hook signal from the OST A.

The IPG 808 may negotiate any required resources with the WIPP 802. Subsequent to resource negotiation, a conversation and/or data transfer may proceed with voice packets being communicated between WIPP 802 and OSTA 810. The WS 806 may snoop on at least some or all VoIP protocol messages. The WS 806 may be adapted to enable switching and QoS for the conversation. The WS 806 may also pass call or configuration information to the AP 804. The AP 804 may acknowledge the received configuration information. The AP 804 may enable 802.11 e QoS for this call. The AP configuration and acknowledgement message sent from AP' 804 to WS 806 may be messaging protocol messages. In accordance with an aspect of the invention, the messages that may be snooped on by the WS 806 are illustrated using the solid circle associated with WLAN 806.

Figure 9:
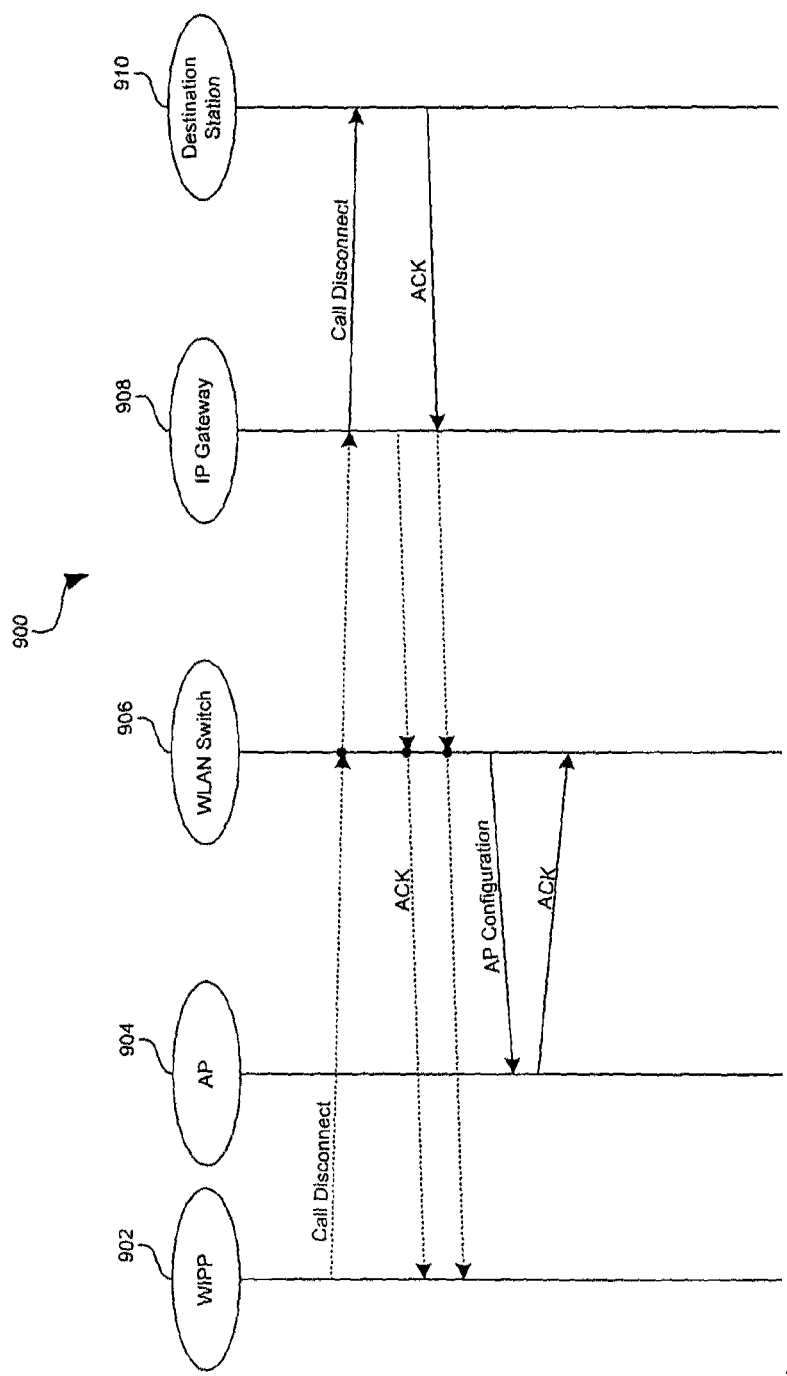
FIG. 9 is an exemplary call termination scenario in accordance with an embodiment of the invention.

In another embodiment of the invention, a call termination scenario may be provided. FIG. 9 is an exemplary call termination scenario 900 in accordance with an embodiment of the invention. Referring to FIG. 9, there is shown a wireless IP phone (WIPP) 902, an access point 904, a WLAN switch (WS) 906, and IP gateway (IPG) 908 and a destination station (OTSA) 910. Prior to initiation, the WIPP 902 may broadcast beacon frames out to all wireless devices in its vicinity to announce its presence and its MAC address. The WIPP 902 may send a call disconnect request to the IPG 908. The IPG 908 may send a connection request to the OSTA 910. The IPG 908 may send a disconnection request to the OSTA 910. The IPG may also send a disconnection ACK to WIPP 902. The IPG 908 may release resources for the call session.

The WLAN switch 906 may be adapted to snoop on some or all VoIP protocol messages. The WLAN switch 906 may release resources for the call session such as QoS resources. The WLAN switch 906 may also pass call information to the AP 904 using, for example, an AP configuration message. The AP 904 may send an acknowledgement message to the WS 906. The AP configuration message sent to the AP 904 and the ACK message sent from the AP 904 to the WS 906 may be messaging protocol messages. The call disconnect and ACK message sent from the OST A to I PG 908 and the ACK message sent from the IPG 908 to WIPP 902 may be VoIP compliant messages. The AP 904 may release resources for the call session. The resources may include, but is not limited to, 802.11e QoS resources. The WIPP 902 may return to the on-hook state. In accordance with an aspect of the invention, the messages that may be snooped on by the WS 906 are illustrated by the solid circle.

Figure 10:
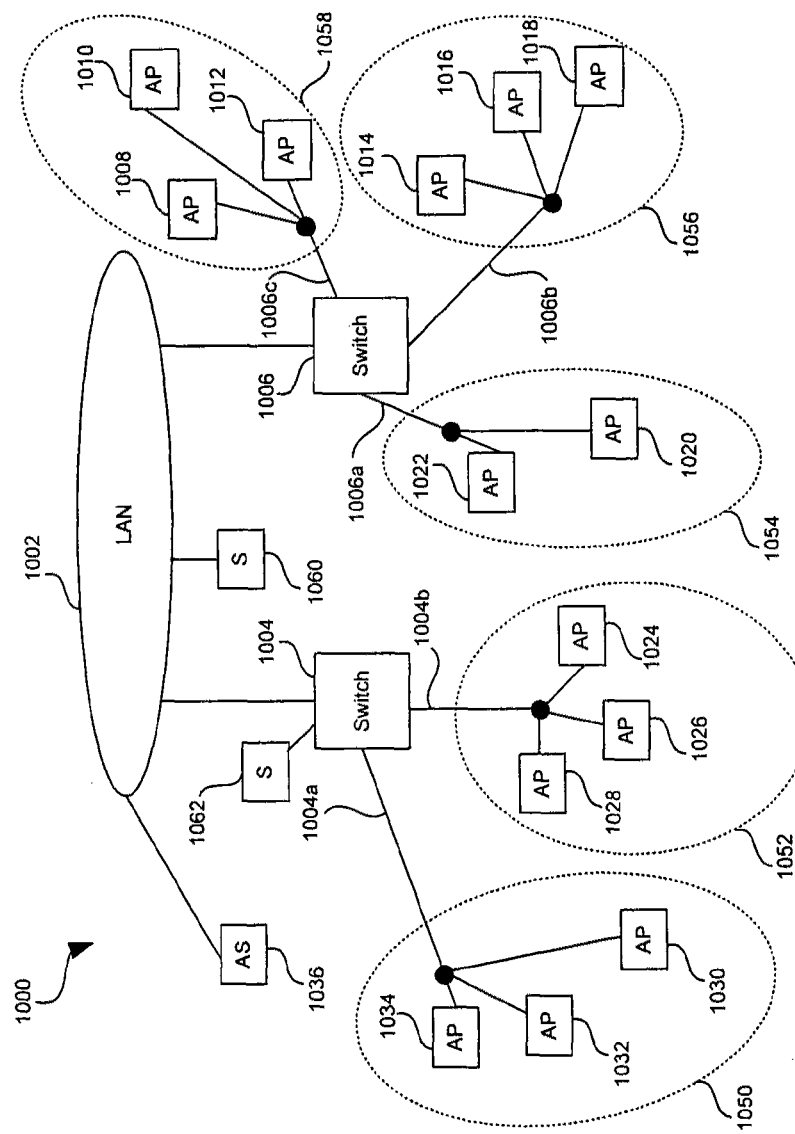
FIG. 10 is a block diagram of exemplary system for access point aggregation and resiliency in a WLAN in accordance with an embodiment of the invention.

FIG. 10 is a block diagram 1000 of an exemplary system for hardware acceleration in a WLAN in accordance with an embodiment of the invention. Referring to FIG. 10, there is shown a local area network (LAN) 1002, authentication server 1036, switches 1004, 1006 and servers 1060, 1062. Switch 1004 may be coupled to a first trunk or trunk group 1004*a*, which may provide connectivity for access points 1034, 1032, 1030. Switch 1004 may be coupled to a first trunk or trunk group 1004*a*, which may provide connectivity to access points 1034, 1032, 1030. Switch 1004 may also be coupled to a second trunk or trunk group 1004*b*, which may provide connectivity to access points 1028, 1026, 1024. Switch 1006 may be coupled to a first trunk or trunk group 1006*a*, which may provide connectivity to access points 1022, 1020. Switch 1006 may also be coupled to a second trunk or trunk group 1006*b*, which may provide connectivity to APs 1014, 1016, 1018. Finally, switch 1006 may be coupled to a third trunk or trunk group 1006*a*, which may provide connectivity to access points 1008, 1010, 1012.

A group of access points may be aggregated based on different criteria, including but not limited to, location and/or functionality. Access points 1034, 1032, 1030 may be aggregated to form a group, for example group 1050. Access points 1024, 1026, 1028 may be aggregated to form a group, for example group 1052. Accordingly, groups 1050, 1052 may be served by switch 1004. Access points 1020, 1022 may be aggregated to form a group, for example group 1054. Access points 1014, 1016, 1018 may be aggregated to form a group, for example group 1056. Similarly, access points 1008, 1010, 1012 may be aggregated to form a group, for example group 1058. Accordingly, groups 1054, 1056 and 1058 may be served by switch 1004.

In accordance with an aspect of the invention, each of the trunks 1006*a*, 1006*b*, 1006*c* of switch 1006 and trunks 1004*a*, 1004*b* of switch 1004 may be adapted to transport data for a particular group of access points. Since access points may be functionally aggregated or grouped, various operational policies and/or procedures related to a particular group may be distributed from switch 1004, 1006 and/or server 1060, 1062 in a centralized manner using one or more switch trunks or trunk groups. In this regard, various security and access polices related to, for example, roamers may be uniformly implemented. Additionally, the WLAN may have the capability to adjust to and/or recover from particular events by distributing various recovery policies to corresponding access point groups. For example, the access points 1008, 1010, 1012 in access point group 1058 may be arranged in, for example, a particular section of a building such as a conference room, in order to provide service to conference participants.

In this regard, whenever a conference is in progress, additional ports may be provisioned to provide adequate coverage to conference participants. More particularly, additional ports may be provisioned from one or more logical switches within switch 1006, thereby providing additional links for trunk group 1006*c* to carry additional traffic. The provisioning of additional links may be achieved dynamically or the links may be manually provisioned. At the end of the conference, since there may not be a need for additional capacity and the previously provisioned link may be decommissioned and provisioned to provide additional capacity elsewhere.

In another embodiment of the invention, the groups of access points may be manually and/or dynamically configured to provide flexibility in distributing various policies and/or operational procedures to the access points serviced by a switch. In this regard, one or more switch ports may be provisioned in order to appropriately distribute information to various access points. For example, groups 1050 and 1052 may be part of an enterprise network served by switch 1004. Notwithstanding, there may be different operation policies and/or procedures that may be associated with each of groups 1050 and 1052. Accordingly, it may be necessary to distribute different policies to group 1050, which includes access points 1030, 1032, 1034 and group 1052, which includes access points 1024, 1026 and 1028.

In another aspect of the invention, a particular policy may be specific to particular access points in one or more access point groups. For example, a particular policy may be specific to access point 1020 in access point group 1052. In this case, switch 1006 may distribute the policy to access point 1020. In order to facilitate dynamic configuration of the groups, one or more software applications associated with the switch may be adapted to provision the trunks that may serve particular groups. Distribution of the policies to access point groups, whether by broadcast or individually, may be conditioned on the occurrence of an event. The event may be automatically or manually generated.

Figure 11:
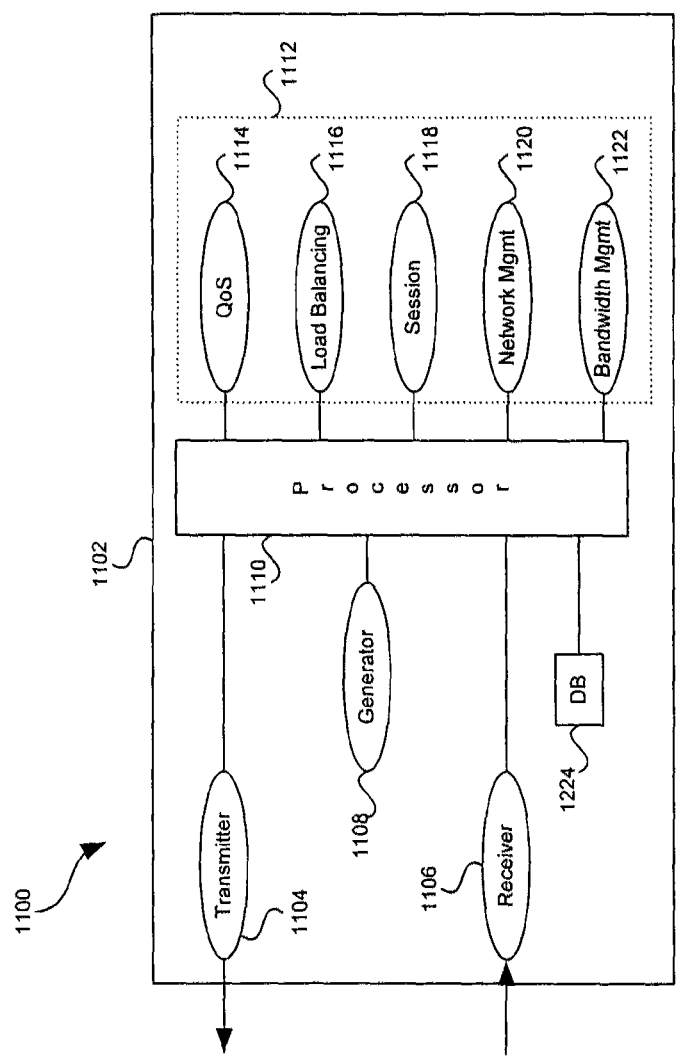
FIG. 11 is a block diagram illustrating access point aggregation and resiliency in the WLAN of FIG. 10 in accordance with an embodiment of the invention.

FIG. 11 is a block diagram 1200 of an exemplary switch 1202 as illustrated in FIG. 10 in accordance with an embodiment of the invention. Referring to FIG. 11, switch 1102 may comprise a processor or switch processor 1110, transmitter 1104, receiver 1106, generator 1108 and controller 1112. The controller 1112 may comprise QoS controller 1114, bandwidth controller 1122, load balancing controller 1116, session controller 1118 and network management controller 1120. The transmitter 1104, receiver 1106, generator 1108 and the components of the controller 1112, namely QoS controller 1114, load balancing controller 1116, session controller 1118 and network management controller 1120, may be variously coupled to processor 1110.

The components of switch 1102 may comprise suitable circuitry and/or software capable of implementing the various network management functions, including but not limited to, hardware acceleration, access point aggregation and resiliency, load balancing, QoS management, bandwidth management, session management and control. Notwithstanding, although the components of the switch 1102 are individually shown, the invention is not limited in this regard. For example, with suitable software and/or logic, the generator function 1108 may be implemented solely by the processor 1122. Similarly, anyone or more of the access point aggregation and resiliency, bandwidth management, QoS management, load balancing, session management and control, and network management may be integrated and with suitable logic and/or software, may be executed by the processor 1110.

In accordance with an embodiment of the invention, switch processor 1110 may be adapted to facilitate hardware acceleration. Switch processor 1110, with suitable circuitry and/or software may be adapted to utilize information from transmitter 1104, receiver 1106, generator 1108 and/or controller 1112 to facilitate hardware acceleration. Additionally, switch processor 1110 may utilize one or more messaging protocol messages to achieve hardware acceleration.

Switch processor 1110 may be adapted to create at least one policy to be distributed among one or more of a plurality of access point groups, for example 1050, 1052, 1054 (FIG. 10). Switch processor 1110 may associate the policy with one or more of the access point groups, for example 1050, 1052. After identifying the policy, transmitter 1104 may distribute the policy to one or more access points in access point groups 1050, 1052. Switch processor 1110 may be adapted to condition the distribution of the policy on the occurrence of an event. Accordingly, the transmitter 1104 may distribute the policy to a particular access point group upon occurrence of the event. For example, upon the happening of a stated event, then switch 1006 may distribute a policy the access point 1016 in access point group 1056. Similarly, a triggering event may cause various policies to be broadcast to access point group 1054, 1054 1058. Accordingly, access points 1008, 1010, 1012, 1014, 1016, 1018,1020 and 1022 may receive one or more broadcasted policies.

The switch processor 1110 may be adapted to associate the policy with a particular access point in a particular access point group. Accordingly, the transmitter 1104 may be instructed by the switch processor 1110 to distribute the policy to the particular access point in the particular access point group. The policy may be transferred from switch 1004, 1006 and/or a server 1060, 1062. In another aspect of the invention, the transmitter 1104 may be adapted to broadcast the policy from the switch and/or server to at least a portion of the access point groups. The policy may be encapsulated in a messaging protocol message which may be used to distribute the policy.

Figure 12:
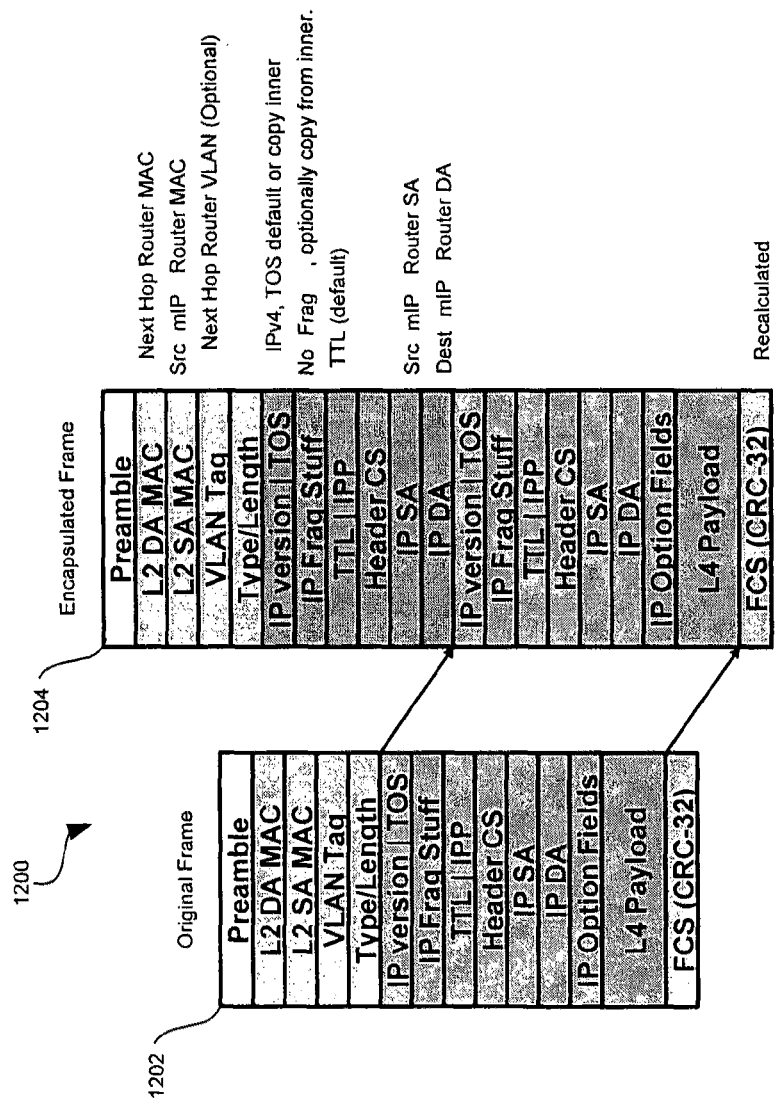
FIG. 12 is a block diagram of an exemplary Ethernet frame carrying Internet Protocol (IP) and its encapsulated counterpart using IP in IP Tunneling encapsulation that may be utilized in connection with hardware acceleration in accordance with an embodiment of the invention.
Figure 13:
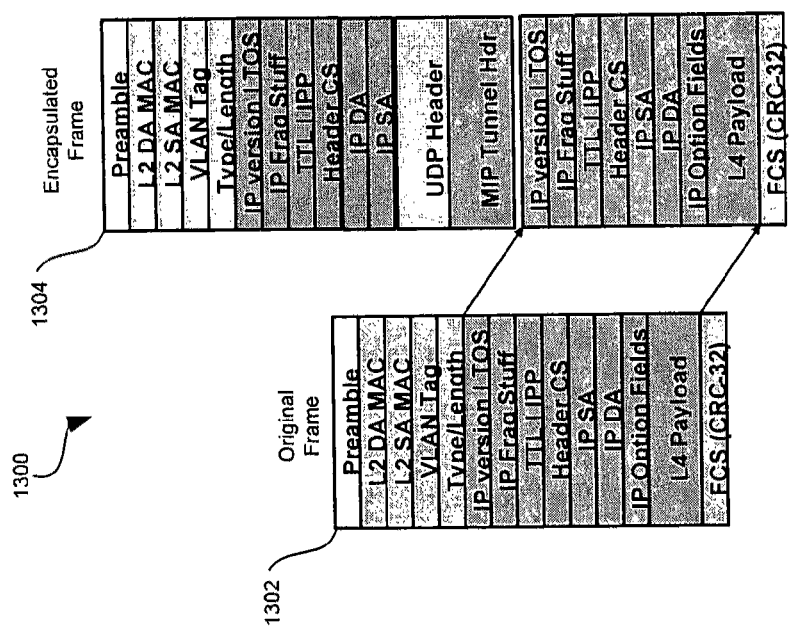
FIG. 13 is a block diagram of another exemplary Ethernet frame carrying IP and its encapsulated counterpart using IP in UDP tunneling encapsulation that may be utilized in connection with hardware acceleration in accordance with an embodiment of the invention.
Figure 14:
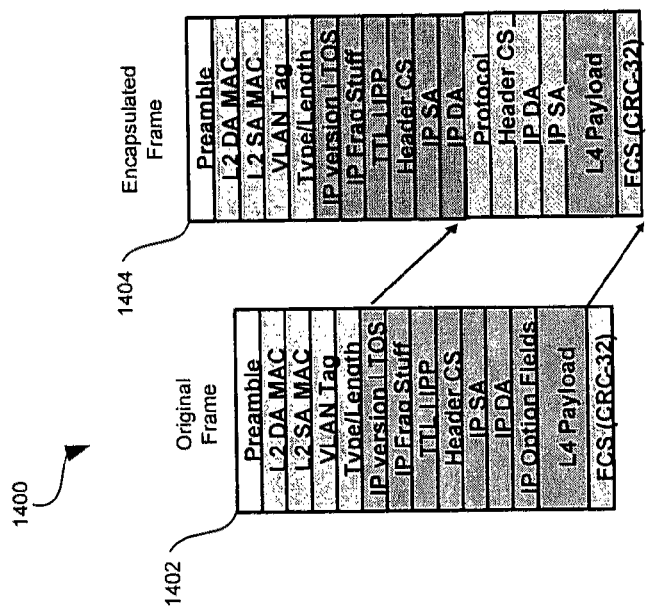
FIG. 14 is a block diagram of another exemplary Ethernet frame carrying IP and its encapsulated counter part using minimal IP tunneling encapsulation that may be utilized in connection with hardware acceleration in accordance with an embodiment of the invention.

The switch processor 1110 may be further adapted to hardware accelerate the frames forwarding using tunneling Encapsulation methods including, but not limited to, the exemplary encapsulation methods described in FIG. 12, FIG. 13 and FIG. 14.

FIG. 12 is a block diagram 1200 of an exemplary Ethernet frame carrying Internet Protocol (IP) and its encapsulated counterpart using IP in IP Tunneling encapsulation that may be utilized in connection with hardware acceleration in accordance with an embodiment of the invention. Referring to FIG. 12, there is shown an original frame 1202 and it encapsulated counterpart frame 1204. The encapsulated counterpart frame 1204 has been encapsulated using IP in IP tunneling encapsulation.

FIG. 13 is a block diagram 1300 of another exemplary Ethernet frame carrying IP and its encapsulated counterpart using IP in UDP tunneling encapsulation that may be utilized in connection with hardware acceleration in accordance with an embodiment of the invention. Referring to FIG. 13, there is shown an original frame 1302 and its encapsulated counterpart frame 1304. The encapsulated counterpart frame 1304 has been encapsulated using IP in UDP tunneling encapsulation.

FIG. 14 is a block diagram 1400 of another exemplary Ethernet frame carrying IP and its encapsulated counter part using minimal IP tunneling encapsulation that may be utilized in connection with hardware acceleration in accordance with an embodiment of the invention. Referring to FIG. 14, there is shown an original frame 1402 and its encapsulated counterpart frame 1404. The encapsulated counterpart frame 1404 has been encapsulated using minimal IP tunneling encapsulation.

U.S. patent application Ser. No. 10/607,094 entitled "Communication System and Method in a Hybrid Wired/Wireless Local Area Network" filed on Jun. 26, 2003, discloses a messaging protocol that may be utilized by the switch in accordance with an embodiment of the invention, and is incorporated herein by reference in its entirety. Exemplary valid fields and subfields for various messaging protocol messages that may be utilized by the switch in accordance with an aspect of the invention are disclosed therein. The method and system disclosed therein may be adapted to utilize the messaging protocol to provide hardware acceleration in accordance with an embodiment of the invention.

U.S. patent application Ser. No. 10/658,140, now U.S. Pat. No. 7,164,663, entitled "Method and System for Providing an Intelligent Switch in a Hybrid Wired/Wireless Local Area Network" filed on Sep. 9, 2003, discloses a switch that may utilize the messaging protocol in accordance with an embodiment of the invention, and is incorporated herein by reference in its entirety. The switch disclosed therein may be adapted to utilize the messaging protocol to provide hardware acceleration in accordance with an embodiment of the invention.

U.S. patent application Ser. No. 10/658,514 entitled "Method and System for Network Management in a Hybrid Wired/Wireless Local Area Network" filed on Sep. 9, 2003, discloses a switch that may utilize the messaging protocol for network management in accordance with an embodiment of the invention, and is incorporated herein by reference in its entirety. The method and system disclosed therein may be adapted to utilize the messaging protocol to provide hardware acceleration in accordance with an embodiment of the invention.

U.S. patent application Ser. No. 10/658,725, entitled "Method and System for Providing and Intelligent Switch for Bandwidth Management in a Hybrid Wired/Wireless Local Area Network" filed on Sep. 9, 2003, discloses a switch that may utilize the messaging protocol for bandwidth management in accordance with an embodiment of the invention, and is incorporated herein by reference in its entirety. The method and system disclosed therein may be adapted to utilize the messaging protocol to provide hardware acceleration in accordance with an embodiment of the invention.

U.S. patent application Ser. No. 10/658,734 entitled "Method and System for Providing Optimal Load Balancing in a Hybrid Wired/Wireless Local Area Network" filed on Sep. 9, 2003, discloses a switch that may utilize the messaging protocol for optimal load balancing in accordance with an embodiment of the invention, and is incorporated herein by reference in its entirety. The method and system disclosed therein may be adapted to utilize the messaging protocol to provide access hardware acceleration in accordance with an embodiment of the invention.

U.S. patent application Ser. No. 10/658,450 entitled "Method and System for Access Point (AP) Aggregation and Resiliency in a Hybrid Wired/Wireless Local Area Network" filed on Sep. 9, 2003, discloses a switch that may utilize the messaging protocol for access point aggregation and resiliency in accordance with an embodiment of the invention, and is incorporated herein by reference in its entirety. The method and system disclosed therein may be adapted to utilize the messaging protocol to provide access hardware acceleration in accordance with an embodiment of the invention.

In accordance with another embodiment of the invention, dependent on the modulation scheme utilized, one or more of the PCLP frames illustrated in FIG. 1 b, FIG. 1 c, FIG. 1 d and FIG. 1 e may be adapted to contain information which may be utilized for access point aggregation and resiliency in a WLAN in accordance with various embodiments of the invention. Additionally, the PCLP frames may be adapted to convey information for anyone or more of the 801.11 a, 802.11 band 802.11 g modes of operation utilized by access points and/or access devices in accordance the embodiments of the invention.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. A method for hardware acceleration in a hybrid wired/wireless local area network, the method comprising:
creating at least one policy to be distributed among at least one of a plurality of access point groups;
associating said at least one policy with a particular one of said plurality of access point groups; and
distributing said associated at least one policy to at least one access point in said particular one of said plurality of access point groups via tunneling encapsulation.

2. The method according to claim 1, comprising identifying said associated policy to be distributed to said particular one of said plurality of access point groups.

3. The method according to claim 2, comprising conditioning selection of said identified policy upon occurrence of an event.

4. The method according to claim 3, wherein said distributing comprises distributing said identified policy to said particular one of said plurality of access point groups upon said occurrence of said event.

5. The method according to claim 4, comprising associating said at least one policy with a particular access point in said particular one of said plurality of access point groups.

6. The method according to claim 5, wherein said distributing comprises distributing said identified policy to said particular access point in said particular one of said plurality of access point groups.

7. The method according to claim 1, comprising communicating said at least one policy from at least one of a switch and a server to at least one access point in said particular one of said plurality of access point groups.

8. The method according to claim 7, comprising broadcasting said at least one policy from said at least one of said switch and said server to said particular one of said plurality of access point groups.

9. The method according to claim 8, comprising distributing said at least one policy using at least one messaging protocol message.

10. A non-transitory machine-readable storage, having stored thereon a computer program having at least one code section for hardware acceleration in a hybrid wired/wireless local area network, the at least one code section executable by a machine for causing the machine to perform the steps comprising:

creating at least one policy to be distributed among at least one of a plurality of access point groups;

associating said at least one policy with a particular one of said plurality of access point groups; and distributing said associated at least one policy to at least one access point in said particular one of said plurality of access point groups via tunneling encapsulation.

11. The machine-readable according to claim 10, comprising code for identifying said associated policy to be distributed to said particular one of said plurality of access point groups.

12. The machine-readable according to claim 11, comprising code for conditioning selection of said identified policy upon occurrence of an event.

13. The machine-readable according to claim 12, wherein said distributing code comprises code for distributing said identified policy to said particular one of said plurality of access point groups upon said occurrence of said event.

14. The machine-readable according to claim 13, comprising associating said at least one policy with a particular access point in said particular one of said plurality of access point groups.

15. The machine-readable according to claim 14, wherein said distributing code comprises code for distributing said identified policy to said particular access point in said particular one of said plurality of access point groups.

16. The machine-readable according to claim 10, comprising code for communicating said at least one policy from at least one of a switch and a server to said one or more access point in said particular one of said plurality of access point groups.

17. The machine-readable according to claim 16, comprising code for broadcasting said at least one policy from said at least one of said switch and said server to said particular one of said plurality of access point groups.

18. The machine-readable according to claim 17, comprising code for distributing said at least one policy using at least one messaging protocol message.

19. A system for hardware acceleration in a hybrid wired/wireless local area network, the system comprising one or more circuits configured to:

create at least one policy to be distributed among at least one of a plurality of access point groups;

associate said at least one policy with a particular one of said plurality of access point groups; and distribute said associated at least one policy to at least one access point in said particular one of said plurality of access point groups via tunneling encapsulation.

20. The system according to claim 19, wherein said one or more circuits are operable to identify said associated policy to be distributed to said particular one of said plurality of access point groups.

21. The system according to claim 20, wherein said one or more circuits are operable to condition selection of said identified policy upon occurrence of an event.

22. The system according to claim 21, wherein said one or more circuits are operable to distribute said identified policy to said particular one of said plurality of access point groups upon said occurrence of said event.

23. The system according to claim 22, wherein said one or more circuits are operable to associate said at least one policy with a particular access point in said particular one of said plurality of access point groups.

24. The system according to claim 23, wherein said one or more circuits are operable to distribute said identified policy to said particular access point in said particular one of said plurality of access point groups.

25. The system according to claim 19, wherein said one or more circuits are operable to communicate said at least one policy from at least one of a switch and a server to said at least one access point in said particular one of said plurality of access point groups.

26. The system according to claim 25, wherein said one or more circuits are operable to broadcast said at least one policy from said at least one of said switch and said server to said particular one of said plurality of access point groups.

27. The system according to claim 26, wherein said one or more circuits are operable to distribute said at least one policy using at least one messaging protocol message.

28. A method for hardware acceleration in a hybrid wired/wireless local area network, the method comprising:

creating at least one policy to be distributed among at least one of a plurality of access point groups;

associating said at least one policy with a particular access point within a particular one of said plurality of access point groups; and distributing said associated at least one policy to said particular access point within said particular one of said plurality of access point groups via tunneling encapsulation.

29. The method according to claim 28, comprising identifying said associated policy to be distributed to said particular access point.

30. The method according to claim 29, comprising conditioning selection of said identified policy upon occurrence of an event.

31. The method according to claim 30, wherein said distributing comprises distributing said identified policy to said particular access point upon said occurrence of said event.

32. The method according to claim 28, comprising communicating said at least one policy from at least one of a switch and a server to said particular access point in said particular one of said plurality of access point groups.

33. The method according to claim 32, comprising broadcasting said at least one policy from said at least one of said switch and said server to said particular access point in said particular one of said plurality of access point groups.

34. A non-transitory machine-readable storage, having stored thereon a computer program having at least one code section for hardware acceleration in a hybrid wired/wireless local area network, the at least one code section executable by a machine for causing the machine to perform the steps comprising:

creating at least one policy to be distributed among at least one of a plurality of access point groups;

associating said at least one policy with a particular access point within a particular one of said plurality of access point groups; and distributing said associated at least one policy to said particular access point within said particular one of said plurality of access point groups via tunneling encapsulation.

35. The machine-readable storage according to claim 34, wherein said at least one code section comprises code for identifying said associated policy to be distributed to said particular access point.

36. The machine-readable storage according to claim 35, wherein said at least one code section comprises code for conditioning selection of said identified policy upon occurrence of an event.

37. The machine-readable storage according to claim 36, wherein said at least one code section comprises code for distributing said identified policy to said particular access point upon said occurrence of said event.

38. The machine-readable storage according to claim 34, wherein said at least one code section comprises code for communicating said at least one policy from at least one of a switch and a server to said particular access point in said particular one of said plurality of access point groups.

39. The machine-readable storage according to claim 38, wherein said at least one code section comprises code for broadcasting said at least one policy from said at least one of said switch and said server to said particular access point in said particular one of said plurality of access point groups.

40. A system for hardware acceleration in a hybrid wired/wireless local area network, the system comprising one or more circuits configured to:
   create at least one policy to be distributed among at least one of a plurality of access point groups;
   associate said at least one policy with a particular access point within a particular one of said plurality of access point groups; and
   distribute said associated at least one policy to said particular access point within said particular one of said plurality of access point groups via tunneling encapsulation.

41. The system according to claim 40, wherein said one or more circuits are operable to identify said associated policy to be distributed to said particular access point.

42. The system according to claim 41, wherein said one or more circuits are operable to condition selection of said identified policy upon occurrence of an event.

43. The system according to claim 42, wherein said one or more circuits are operable to distribute said identified policy to said particular access point upon said occurrence of said event.

44. The system according to claim 40, wherein said one or more circuits are operable to communicate said at least one policy from at least one of a switch and a server to said particular access point in said particular one of said plurality of access point groups.

45. The system according to claim 44, wherein said one or more circuits are operable to broadcast said at least one policy from said at least one of said switch and said server to said particular access point in said particular one of said plurality of access point groups.

* * * * *